(12) United States Patent
Pickard

(10) Patent No.: US 10,636,950 B2
(45) Date of Patent: Apr. 28, 2020

(54) LIGHTING DEVICE AND METHOD OF MAKING LIGHTING DEVICE

(71) Applicant: CREE, INC., Durham, NC (US)

(72) Inventor: Paul Kenneth Pickard, Acton, CA (US)

(73) Assignee: IDEAL Industries Lighting LLC, Sycamore, IL (US)

( * ) Notice: Subject to any disclaimer, the term of this patent is extended or adjusted under 35 U.S.C. 154(b) by 3 days.

(21) Appl. No.: 15/599,606

(22) Filed: May 19, 2017

(65) Prior Publication Data

US 2017/0256689 A1 Sep. 7, 2017

Related U.S. Application Data

(62) Division of application No. 13/368,177, filed on Feb. 7, 2012, now Pat. No. 9,698,322.

(51) Int. Cl.
*H01L 33/58* (2010.01)
*H01L 27/15* (2006.01)
*H01L 25/075* (2006.01)

(52) U.S. Cl.
CPC .......... *H01L 33/58* (2013.01); *H01L 25/0753* (2013.01); *H01L 27/156* (2013.01); *H01L 2924/0002* (2013.01); *Y10T 29/49002* (2015.01); *Y10T 29/49124* (2015.01)

(58) Field of Classification Search
CPC ......... H01L 2924/0002; H01L 2924/00; H01L 25/0753; H01L 27/156; H01L 33/58; Y10T 29/49002; Y10T 29/49124
See application file for complete search history.

(56) References Cited

U.S. PATENT DOCUMENTS

| | | | |
|---|---|---|---|
| 6,188,527 B1 * | 2/2001 | Bohn | B29D 11/00365 257/100 |
| 6,614,103 B1 | 9/2003 | Durocher et al. | |
| 6,663,838 B1 | 12/2003 | Soller | |

(Continued)

FOREIGN PATENT DOCUMENTS

JP 2011249158 12/2011

OTHER PUBLICATIONS

Patel, Usha, *Non-Isolated Driver Protection for LED Lamps*, date unknown, 6 pages.

(Continued)

*Primary Examiner* — Tsion Tumebo
(74) *Attorney, Agent, or Firm* — Burr & Brown, PLLC

(57) ABSTRACT

A lighting device comprises a solid state light emitter on a circuit board, and an optic held in place relative to the first circuit board, a voltage drop across the emitter at least 60 volts. A lighting device comprises a solid state light emitter on a first circuit board, an optic held in place relative to the first circuit board, and a non-isolated power supply. A lighting device comprises a solid state light emitter on a first circuit board, and a flame-rated optic held in place relative to the first circuit board. An optic, comprising a translucent region, a first dimension not larger than about 10 mm, a second dimension not larger than 15 mm. A flame-rated optic comprising a translucent region, structure configured to hold the optic in place relative to a circuit board. Methods of making lighting devices.

29 Claims, 19 Drawing Sheets

(56) References Cited

U.S. PATENT DOCUMENTS

| | | | |
|---|---|---|---|
| 6,776,504 B2* | 8/2004 | Sloan | F21S 8/032 362/147 |
| 7,259,403 B2* | 8/2007 | Shimizu | F21L 4/00 257/99 |
| 7,352,011 B2* | 4/2008 | Smits | H01L 33/54 257/100 |
| 7,436,000 B2 | 10/2008 | Kim et al. | |
| 7,709,853 B2 | 5/2010 | Medendorp, Jr. | |
| D617,937 S* | 6/2010 | Farmer | D26/120 |
| 7,841,750 B2* | 11/2010 | Wilcox | F21S 8/081 362/309 |
| D640,210 S* | 6/2011 | Kokubu | D13/180 |
| 8,072,124 B2* | 12/2011 | Liu | F21K 9/27 313/46 |
| 8,207,635 B2 | 6/2012 | Covaro | |
| 8,368,846 B2 | 2/2013 | Kim et al. | |
| 8,388,180 B2* | 3/2013 | Chang | F21V 5/00 362/244 |
| 8,450,748 B2 | 5/2013 | Su | |
| 8,757,834 B2* | 6/2014 | Chang | F21V 5/00 362/244 |
| 9,470,395 B2* | 10/2016 | Marquardt | F21V 7/22 |
| 9,683,715 B2* | 6/2017 | Min | F21V 5/04 |
| 2002/0163810 A1* | 11/2002 | West | H01L 33/58 362/307 |
| 2006/0186425 A1 | 8/2006 | Yano et al. | |
| 2006/0198144 A1* | 9/2006 | Miyairi | A47F 3/001 362/257 |
| 2007/0201225 A1* | 8/2007 | Holder | F21K 9/00 362/227 |
| 2007/0284993 A1* | 12/2007 | Kim | H01L 33/54 313/483 |
| 2009/0283779 A1 | 11/2009 | Negley et al. | |
| 2010/0085751 A1 | 4/2010 | Shaner | |
| 2010/0091491 A1 | 4/2010 | Jiang | |
| 2010/0135020 A1* | 6/2010 | Moore | A47F 11/10 362/249.02 |
| 2010/0177509 A1 | 7/2010 | Pickard | |
| 2010/0181582 A1 | 7/2010 | Li et al. | |
| 2010/0225219 A1 | 9/2010 | Hua | |
| 2010/0289343 A1 | 11/2010 | Covaro et al. | |
| 2011/0078596 A1 | 3/2011 | Rawlins | |
| 2011/0085336 A1* | 4/2011 | Blumel | H01L 33/58 362/255 |
| 2011/0101385 A1 | 5/2011 | Medendorp, Jr. | |
| 2011/0101868 A1 | 5/2011 | Weiss | |
| 2011/0141734 A1* | 6/2011 | Li | F21V 5/04 362/235 |
| 2011/0228528 A1* | 9/2011 | Yang | F21K 9/27 362/235 |
| 2011/0242807 A1* | 10/2011 | Little, Jr. | F21V 5/007 362/235 |
| 2012/0081619 A1* | 4/2012 | Shimizu | G02F 1/133603 348/790 |
| 2012/0199852 A1 | 8/2012 | Lowes et al. | |
| 2012/0218773 A1* | 8/2012 | Peiler | F21V 31/005 362/520 |
| 2012/0243217 A1 | 9/2012 | Szprengiel | |
| 2012/0250309 A1* | 10/2012 | Handsaker | F21V 5/04 362/235 |
| 2013/0193592 A1* | 8/2013 | Peil | F21K 9/00 257/791 |
| 2013/0193850 A1 | 8/2013 | Demuynck | |

OTHER PUBLICATIONS http://www.power-supply-designer.com/2011/05/isolation, *The Isolated Power Supply—A Tutorial*, May 2011, 5 pages.

* cited by examiner

LIGHTING DEVICE AND METHOD OF MAKING LIGHTING DEVICE

CROSS-REFERENCE TO RELATED APPLICATIONS

This application is a division of U.S. patent application Ser. No. 13/368,177, filed Feb. 7, 2012, the entirety of which is incorporated herein by reference as if set forth in its entirety.

FIELD OF THE INVENTIVE SUBJECT MATTER

The inventive subject matter relates to the field of general illumination. In some aspects, the present inventive subject matter relates to a lighting device that comprises at least a first circuit board and at least a first solid state light emitter on the first circuit board. In some aspects, the present inventive subject matter relates to a lighting device that comprises one or more solid state light emitters. In some aspects, the present inventive subject matter relates to a lighting device that comprises at least a first solid state light emitter, in which a voltage supplied to the lighting device is at least 60 volts (and in some aspects, in which a voltage supplied to the lighting device is at least 42.4 volts). In some aspects, the present inventive subject matter relates to a lighting device that comprises at least a first solid state light emitter and at least a first power supply configured to supply power to illuminate the first solid state light emitter, in which the first power supply is non-isolated. In some aspects, the present inventive subject matter relates to one or more components for use in making a lighting device. In some aspects, the present inventive subject matter relates to a method of making a lighting device.

BACKGROUND

There is an ongoing effort to develop systems that are more energy-efficient. A large proportion (some estimates are as high as twenty-five percent) of the electricity generated in the United States each year goes to lighting, a large portion of which is general illumination (e.g., downlights, flood lights, spotlights and other general residential or commercial illumination products). Accordingly, there is an ongoing need to provide lighting that is more energy-efficient.

Solid state light emitters (e.g., light emitting diodes) are receiving much attention due to their energy efficiency. It is well known that incandescent light bulbs are very energy-inefficient light sources—about ninety percent of the electricity they consume is released as heat rather than light. Fluorescent light bulbs are more efficient than incandescent light bulbs (by a factor of about 10) but are still less efficient than solid state light emitters, such as light emitting diodes.

In addition, as compared to the normal lifetimes of solid state light emitters, e.g., light emitting diodes, incandescent light bulbs have relatively short lifetimes, i.e., typically about 750-1000 hours. In comparison, light emitting diodes, for example, have typical lifetimes between 50,000 and 70,000 hours. Fluorescent bulbs have longer lifetimes than incandescent lights (e.g., fluorescent bulbs typically have lifetimes of 10,000-20,000 hours), but provide less favorable color reproduction. The typical lifetime of conventional fixtures is about 20 years, corresponding to a light-producing device usage of at least about 44,000 hours (based on usage of 6 hours per day for 20 years). Where the light-producing device lifetime of the light emitter is less than the lifetime of the fixture, the need for periodic change-outs is presented. The impact of the need to replace light emitters is particularly pronounced where access is difficult (e.g., vaulted ceilings, bridges, high buildings, highway tunnels) and/or where change-out costs are extremely high.

LED lighting systems can offer a long operational lifetime relative to conventional incandescent and fluorescent bulbs. LED lighting system lifetime is typically measured by an "L70 lifetime", i.e., a number of operational hours in which the light output of the LED lighting system does not degrade by more than 30%. Typically, an L70 lifetime of at least 25,000 hours is desirable, and has become a standard design goal. As used herein, L70 lifetime is defined by Illuminating Engineering Society Standard LM-80-08, entitled "*IES Approved Method for Measuring Lumen Maintenance of LED Light Sources*", Sep. 22, 2008, ISBN No. 978-0-87995-227-3, also referred to herein as "LM-80", the disclosure of which is hereby incorporated herein by reference in its entirety as if set forth fully herein.

LEDs also may be energy efficient, so as to satisfy ENERGY STAR® program requirements. ENERGY STAR program requirements for LEDs are defined in "*ENERGY STAR® Program Requirements for Solid State Lighting Luminaires, Eligibility Criteria—Version 1.1*", Final: Dec. 19, 2008, the disclosure of which is hereby incorporated herein by reference in its entirety as if set forth fully herein.

Heat is a major concern in obtaining a desirable operational lifetime for solid state light emitters. As is well known, an LED also generates considerable heat during the generation of light. The heat is generally measured by a "junction temperature", i.e., the temperature of the semiconductor junction of the LED. In order to provide an acceptable lifetime, for example, an L70 of at least 25,000 hours, it is desirable to ensure that the junction temperature should not be above 85° C. In order to ensure a junction temperature that is not above 85° C., various heat sinking schemes have been developed to dissipate at least some of the heat that is generated by the LED. See, for example, Application Note: CLD-APO6.006, entitled *Cree® XLamp® XR Family & 4550 LED Reliability*, published at cree.com/xlamp, September 2008.

In order to encourage development and deployment of highly energy efficient solid state lighting (SSL) products to replace several of the most common lighting products currently used in the United States, including 60-Watt A19 incandescent and PAR 38 halogen incandescent lamps, the Bright Tomorrow Lighting Competition (L Prize™) has been authorized in the Energy Independence and Security Act of 2007 (EISA). The L Prize is described in "*Bright Tomorrow Lighting Competition (L Prize™)*", May 28, 2008, Document No. 08NT006643, the disclosure of which is hereby incorporated herein by reference in its entirety as if set forth fully herein. The L Prize winner must conform to many product requirements including light output, wattage, color rendering index, correlated color temperature, expected lifetime, dimensions and base type.

Although the development of solid state light emitters (e.g., light emitting diodes) has in many ways revolutionized the lighting industry, some of the characteristics of solid state light emitters have presented challenges, some of which have not yet been fully met.

Accordingly, for these and other reasons, efforts have been ongoing to develop ways by which solid state light emitters, which may or may not include luminescent material(s), can be used in place of incandescent lights, fluorescent lights and other light-generating devices in a wide variety of applications. In addition, where light emitting diodes (or other solid state light emitters) are already being used, efforts are ongoing to provide solid state light emitters that are improved, e.g., with respect to energy efficiency, color rendering index (CRI Ra), contrast, efficacy (lm/W), and/or duration of service.

BRIEF SUMMARY

There are two primary types of situations where a lighting device needs to be "flame-rated," i.e., where it is necessary, in order for the lighting device to be listed under current UL 1598 standards, for the lighting device to have structures and/or mechanisms to prevent accidental contact of a user with the active electrical components and to prevent hot material from escaping the lighting device in the event of fire. UL 1598 standards are well known to persons of skill in the art, and descriptions of UL 1598 are readily available.

One type of situation where a lighting device needs to be flame-rated (in order to be listed under current UL 1598 standards) is where the lighting device includes a "non-isolated" power supply. Many solid state light emitters, e.g., light emitting diodes, typically run best on DC current. Line voltage, however, is usually AC. Accordingly, lighting devices that comprise one or more solid state light emitters typically use power supplies to provide appropriate electrical current to the solid state light emitter(s). The expression "non-isolated" means that one or more active electrical input components of the power supply is/are not isolated from one or more active electrical output components of the power supply. Persons of skill in the art are familiar with a wide variety of isolated power supplies and a wide variety of non-isolated power supplies, and persons of skill in the art are very familiar with, and are readily able to, make, obtain, design and implement non-isolated power supplies and isolated power supplies, and to distinguish non-isolated power supplies from isolated power supplies.

Another type of situation where a lighting device needs to be flame-rated is where the voltage supplied to the lighting device exceeds a particular maximum value (e.g., in the U.S., if the voltage supplied to the lighting device exceeds 60 V, an enclosure is required, i.e., the lighting device needs to be flame rated; in Canada, if the voltage supplied to the lighting device exceeds 42.4 V, an enclosure is required). In other words, in order for a lighting device in which a voltage drop across a light emitter (or a combination of light emitters, e.g., a series string of solid state light emitters) is 60 volts or more to be listed under current UL 1598 standards, it is necessary for the lighting device to be flame-rated.

One requirement that must be met in order for a lighting device to be flame-rated is that (1) a barrier around the lighting device (or each region thereof) must be UL 94 5VA rated, or (2) the barrier (or regions thereof) must be made of a material that is UL 94 V0 rated and the barrier must pass the UL 94 5VA 5 inch flame test (i.e., in general, the material is UL 94 V0 rated and is thick enough to pass the UL 94 5VA 5 inch flame test). A statement that a material is "UL 94 5VA rated" means that the material passes the UL 94 5VA test. A statement that a barrier is "UL 94 V0 rated" means that the barrier passes the UL 94 V0 test. The UL 94 5VA test, the UL 94 V0 test, and the UL 94 5VA 5 inch flame test are all well-known to persons of skill in the art, and descriptions of these tests are readily available.

Flame-rated lenses generally have higher lumen loss and greater cost than non-flame-rated lenses. For example, in many instances, flame-rated lenses are made of polycarbonate (PC), which has higher lumen loss and is more expensive than materials (e.g., acrylic such as poly(methyl methacrylate) (i.e., PMMA)) typically used to make non-flame-rated lenses. With large lenses, the cost implications of using a flame-rated PC are multiplied. Accordingly, in many instances, efforts are made to avoid the need to use flame-rated lenses.

As noted above, however, there is an ongoing need to provide lighting devices that are of higher energy efficiency. Better energy efficiency for devices which include one or more solid state light emitters (e.g., one or more LEDs and/or one or more light emitting diode chips) is with "higher voltage, lower current" compared to "lower voltage, higher current".

The improved driver technology at lower drive currents can be viewed as follows:

a) The associated loss of power with current (at fixed resistance) is equal to the square of the current times the resistance (i.e., Power=$I^2R$). Hence, a lower current approach will achieve higher efficiencies;

b) the use of higher voltage, lower current can in many cases make it possible to employ a boost topology (as opposed to, e.g., a buck topology) for the driver topology (persons of skill in the art are familiar with designing circuitry in which there is sufficient voltage headroom for the use of a boost topology, and such persons are familiar with the added energy efficiency that can be enjoyed through the use of a boost driver topology (as opposed to, e.g., a buck driver topology).

In some aspects of the present inventive subject matter, for the sake of energy efficiency gains described above, higher voltage is employed (i.e., one or more high-voltage topology is employed). In some aspects of the present inventive subject matter, high enough voltage is used that a flame-rated enclosure is needed to satisfy UL requirements.

In a first type of high-voltage topology, there is provided a light emitter which comprises a plurality of light emitting devices which are mechanically interconnected to one another (e.g., on a common substrate on which the devices were formed) and which are electrically interconnected in any suitable arrangement (e.g., in series, in an array of at least two serially connected subsets of light emitting devices, each subset comprising at least two light emitting devices electrically connected in parallel, etc.). A wide variety of high-voltage topology devices are described in U.S. patent application Ser. No. 12/017,558, filed on Jan. 22, 2008 (now U.S. Patent Publication No. 2008/0179602), the entirety of which is hereby incorporated by reference as if set forth in its entirety, and other high-voltage topology devices are described in U.S. patent application Ser. No. 12/017,600, filed on Jan. 22, 2008 (now U.S. Patent Publication No. 2008/0211416), the entirety of which is hereby incorporated by reference as if set forth in its entirety. In some embodiments, a light emitter can include a plurality of light emitting devices from a contiguous region of a wafer of light emitting devices. In some embodiments, a plurality of light emitting devices can be formed by depositing stacked active layers, e.g., on a wafer and/or substrate, and then isolating respective regions of those stacked layers from each other (i.e., so that the respective regions are not electrically connected with each other) to provide a plurality of light emitting devices which remain mechanically connected to one another, e.g., by a common wafer and/or substrate. In such a case, the light emitting devices may be defined by one or more insulating regions that define the peripheries of individual light emitting devices, and/or by one or more trenches that define the peripheries of the individual light emitting devices, and the isolated regions of the stacked layers (each of which functions as a separate light emitting device) can be electrically connected to one another in any suitable arrangement (e.g., in series).

In a second type of high-voltage topology, there is provided a light emitter which comprises a plurality of small light emitting devices which are electrically connected to one another such that the light emitter employs high voltage (i.e., at least 60 volts or at least 42.4 volts). In a representative example of this type of high-voltage topology, a single light emitting diode chip (e.g., 1 mm×1 mm) which runs at about 3 volts can be divided into sixteen smaller light emitting diode chips (e.g., by cutting in a 4×4 array), and the sixteen smaller chips can then be placed adjacent one another (e.g., in the form of a 1.4 mm×1.4 mm light emitter), with the sixteen smaller chips connected in series, whereby the light emitter runs at about 48 volts.

The use of a high voltage power supply topology makes it possible to employ smaller, lower cost, and/or more efficient power supplies for solid state lighting applications. For at least reasons discussed above, sse of a high voltage power supply topology, however, also presents challenges. Frequently, especially in large area light sources such as troffers, low-voltage class 2 power supplies are used. Using such low-voltage power supplies makes it possible for the lenses used in these troffers to be made from a non-flame rated material. In the case of a high voltage supply (and corresponding high voltage LEDs), as noted above, these voltages incur a regulatory requirement to have a flame-rated lens.

In accordance with some aspects of the present inventive subject matter, there is provided an optic that is made from a flame-rated resin and that is attached to a solid state light emitter circuit board on which one or more solid state light emitters (e.g., one or more LEDs and/or one or more light emitting diode chips) are provided, and optionally the optic interfaces to at least one of the one or more solid state light emitters with one or more index-matching structures. Also, optionally, the flame-rated optic may include one or more refractive elements to direct, collimate or otherwise modify the light distribution from at least one of the one or more solid state light emitters.

By having the flame-rated material attached to the solid state light emitter circuit board (and optionally in very close proximity to at least one of the one or more solid state light emitters), the solid state light emitter circuit board/optic assembly itself becomes the "light source", without need for further UL-required flame barriers. Because the area of the solid state light emitter circuit board is usually much smaller than the area of the lenses (e.g., in many instances, an LED printed circuit board is between 50% of the lens size for downlights and as little as 5% or less in a troffer), the cost of the flame-rated material is much lower. Any increased light absorption in the flame-rated material is still present, but can be mitigated by the use of an index matching material, e.g., to reduce, minimize or eliminate Fresnel losses that might otherwise occur at the entry surface of a flame-rated lens.

In accordance with one aspect of the present inventive subject matter, there is provided a lighting device, comprising:

at least a first circuit board; and
at least a first optic held in place relative to the first circuit board.

In accordance with another aspect of the present inventive subject matter, there is provided a lighting device, comprising:

at least a first solid state light emitter; and at least a first optic held in place relative to the first solid state light emitter.

In accordance with a first aspect of the present inventive subject matter, there is provided a lighting device, comprising:

at least a first circuit board;
at least a first solid state light emitter on the first circuit board; and
at least a first optic held in place relative to the first circuit board,
at least part of the first solid state light emitter between at least a portion of the first circuit board and at least a portion of the first optic,
if the first solid state light emitter is illuminated, at least a portion of light emitted by the first solid state light emitter passes through the first optic, and
a voltage supplied to the lighting device is at least 60 volts (or in another aspect, at least 42.4 volts), or in other aspects of the present inventive subject matter, at least 10 volts, at least 20 volts, at least 30 volts, at least 40 volts, at least 50 volts, at least 70 volts, at least 80 volts, 60-200 volts, 70-150 volts, 80-100 volts, 10-250 volts, 20-220 volts, 30-200 volts, 40-180 volts, 50-160 volts, 60-150 volts, 60-140 volts, 60-130 volts, 60-120 volts, 60-110 volts, 60-100 volts, or 60-80 volts.

In accordance with a second aspect of the present inventive subject matter, there is provided a lighting device, comprising:

at least a first circuit board;
at least a first solid state light emitter on the first circuit board;
at least a first optic held in place relative to the first circuit board; and
at least a first non-isolated power supply configured to supply power to illuminate the first solid state light emitter;
at least part of the first solid state light emitter between at least a portion of the first circuit board and at least a portion of the first optic, and
if the first solid state light emitter is illuminated, at least a portion of light emitted by the first solid state light emitter passes through the first optic.

In accordance with a third aspect of the present inventive subject matter, there is provided a lighting device, comprising:

at least a first circuit board;
at least a first solid state light emitter on the first circuit board; and
at least a first optic held in place relative to the first circuit board,
at least part of the first solid state light emitter between at least a portion of the first circuit board and at least a portion of the first optic,
if the first solid state light emitter is illuminated, at least a portion of light emitted by the first solid state light emitter passes through the first optic, and
the first optic is flame-rated.

In some embodiments in accordance with any of the first, second and third aspects of the present inventive subject matter, which can include or not include, as suitable, any of the other features described herein, the first optic comprises at least a first luminescent material.

In some embodiments in accordance with any of the first, second and third aspects of the present inventive subject matter, which can include or not include, as suitable, any of the other features described herein, the lighting device further comprises at least a first index-matching element between at least a portion of the first solid state light emitter and the first optic. In some of such embodiments, which can include or not include, as suitable, any of the other features described herein, the index-matching element comprises at least a first luminescent material.

In some embodiments in accordance with any of the first, second and third aspects of the present inventive subject matter, which can include or not include, as suitable, any of the other features described herein, the first solid state light emitter is an LED.

In some embodiments in accordance with any of the first, second and third aspects of the present inventive subject matter, which can include or not include, as suitable, any of the other features described herein, the first solid state light emitter is a light emitting diode chip in direct contact with the first circuit board.

In some embodiments in accordance with any of the first, second and third aspects of the present inventive subject matter, which can include or not include, as suitable, any of the other features described herein, the first solid state light emitter comprises a plurality of light emitting devices formed by depositing stacked active layers on a wafer and/or substrate, and then isolating respective regions of those stacked layers from each other to provide a plurality of light emitting devices which are mechanically connected to one another.

In some embodiments in accordance with any of the first, second and third aspects of the present inventive subject matter, which can include or not include, as suitable, any of the other features described herein, the first solid state light emitter comprises a plurality of light emitting diode chips arranged in series on a first region of the first circuit board, the first region having a surface area of not larger than about 2.0 square millimeters.

In some embodiments in accordance with any of the first, second and third aspects of the present inventive subject matter, which can include or not include, as suitable, any of the other features described herein, at least a first dimension of the lighting device is not larger than about 10 mm (and in some embodiments, not larger than about 8 mm; in some embodiments, not larger than about 6 mm; in some embodiments, not larger than about 4 mm; and in some embodiments, not larger than about 2 mm). In some of such embodiments, which can include or not include, as suitable, any of the other features described herein, at least a second dimension of the lighting device is not larger than about 15 mm (and in some embodiments, not larger than about 10 mm; in some embodiments, not larger than about 8 mm; and in some embodiments, not larger than about 6 mm).

In some embodiments in accordance with any of the first, second and third aspects of the present inventive subject matter, which can include or not include, as suitable, any of the other features described herein, the first optic is in direct contact with the first circuit board.

In some embodiments in accordance with either of the first and second aspects of the present inventive subject matter, which can include or not include, as suitable, any of the other features described herein, the first optic is flame-rated.

In some embodiments in accordance with either of the first and third aspects of the present inventive subject matter, which can include or not include, as suitable, any of the other features described herein, the lighting device further comprises at least a first power supply. In some of such embodiments, which can include or not include, as suitable, any of the other features described herein, the first power supply is non-isolated.

In accordance with a fourth aspect of the present inventive subject matter, there is provided an optic, comprising:

at least a first substantially transparent region, at least a first dimension of the optic not larger than about 10 mm, at least a second dimension of the optic not larger than about 15 mm.

In some embodiments in accordance with the fourth aspect of the present inventive subject matter, which can include or not include, as suitable, any of the other features described herein, the optic is flame-rated.

In some embodiments in accordance with the fourth aspect of the present inventive subject matter, which can include or not include, as suitable, any of the other features described herein, the optic comprises at least one structure configured to hold the optic in place relative to a circuit board comprising six sides, each side substantially parallel to one other of the sides and substantially perpendicular to four other of the sides.

In some embodiments in accordance with the fourth aspect of the present inventive subject matter, which can include or not include, as suitable, any of the other features described herein, the optic comprises at least first and second structures configured to hold the optic in place relative to a circuit board by contacting opposite sides of the circuit board.

In accordance with a fifth aspect of the present inventive subject matter, there is provided an optic, comprising:

at least a first substantially transparent region, at least one structure configured to hold the optic in place relative to a circuit board, the optic flame-rated.

In some embodiments in accordance with the fifth aspect of the present inventive subject matter, which can include or not include, as suitable, any of the other features described herein, the at least one structure configured to hold the optic in place relative to a circuit board comprises at least one structure configured to hold the optic in place relative to a circuit board comprising six sides, each side substantially parallel to one other of the sides and substantially perpendicular to four other of the sides.

In some embodiments in accordance with the fifth aspect of the present inventive subject matter, which can include or not include, as suitable, any of the other features described herein, the at least one structure configured to hold the optic in place relative to a circuit board optic comprises at least first and second structures configured to hold the optic in place relative to a circuit board by contacting opposite sides of the circuit board.

In some embodiments in accordance with either of the fourth and fifth aspects of the present inventive subject matter, which can include or not include, as suitable, any of the other features described herein, the first optic comprises at least a first luminescent material.

In some embodiments in accordance with either of the fourth and fifth aspects of the present inventive subject matter, which can include or not include, as suitable, any of the other features described herein, the optic comprises at least one curved region.

In some embodiments in accordance with either of the fourth and fifth aspects of the present inventive subject matter, which can include or not include, as suitable, any of the other features described herein, the optic comprises at least one curved region on each of two opposite sides.

In accordance with a sixth aspect of the present inventive subject matter, there is provided a method of making a lighting device, comprising:

bringing at least a first structure of a first optic into contact with a first circuit board, the first structure configured to hold the first optic in place relative to the first circuit board, at least a first solid state light emitter on the first circuit board, so that:

at least part of the first solid state light emitter is between at least a portion of the first circuit board and at least a portion of the first optic, and if the first solid state light emitter is illuminated, at least a portion of light emitted by the first solid state light emitter passes through the first optic.

In some embodiments in accordance with the sixth aspect of the present inventive subject matter, which can include or not include, as suitable, any of the other features described herein, a voltage of at least 60 volts (and in some embodiments, at least 42.4 volts) is supplied to the lighting device.

In some embodiments in accordance with the sixth aspect of the present inventive subject matter, which can include or not include, as suitable, any of the other features described herein, the method further comprises placing at least a first index-matching element so that the first index-matching element is between at least a portion of the first solid state light emitter and the first optic.

In some embodiments in accordance with the sixth aspect of the present inventive subject matter, which can include or not include, as suitable, any of the other features described herein, the first optic is flame-rated.

In some embodiments in accordance with the sixth aspect of the present inventive subject matter, which can include or not include, as suitable, any of the other features described herein, the first solid state light emitter is an LED.

In some embodiments in accordance with the sixth aspect of the present inventive subject matter, which can include or not include, as suitable, any of the other features described herein, the first solid state light emitter is a light emitting diode chip in direct contact with the first circuit board.

In some embodiments in accordance with the sixth aspect of the present inventive subject matter, which can include or not include, as suitable, any of the other features described herein, the first solid state light emitter comprises a plurality of light emitting devices formed by depositing stacked active layers on a wafer and/or substrate, and then isolating respective regions of those stacked layers from each other to provide a plurality of light emitting devices which are mechanically connected to one another.

In some embodiments in accordance with the sixth aspect of the present inventive subject matter, which can include or not include, as suitable, any of the other features described herein, the first solid state light emitter comprises a plurality of light emitting diode chips arranged in series on a first region of the first circuit board, the first region having a surface area of not larger than about 2.0 square millimeters.

In some embodiments in accordance with the sixth aspect of the present inventive subject matter, which can include or not include, as suitable, any of the other features described herein, at least a first dimension of the optic is not larger than about 10 mm (and in some embodiments, not larger than about 8 mm; in some embodiments, not larger than about 6 mm; in some embodiments, not larger than about 4 mm; and in some embodiments, not larger than about 2 mm).

In some embodiments in accordance with the sixth aspect of the present inventive subject matter, which can include or not include, as suitable, any of the other features described herein, at least a second dimension of the optic is not larger than about 15 mm (and in some embodiments, not larger than about 10 mm; in some embodiments, not larger than about 8 mm; and in some embodiments, not larger than about 6 mm).

In some embodiments in accordance with the sixth aspect of the present inventive subject matter, which can include or not include, as suitable, any of the other features described herein, the method further comprises electrically connecting at least a first power supply to the first circuit board. In some of such embodiments, which can include or not include, as suitable, any of the other features described herein, the first power supply is non-isolated.

In some embodiments in accordance with the present inventive subject matter, one or more features can be provided to self-secure an optic to a circuit board (e.g., an LED printed circuit board). These features themselves can optionally provide mechanical retention and compression for thermal benefit within the larger system.

In some embodiments in accordance with the present inventive subject matter, one or more of the following can be achieved:

implementation of a high voltage LED system, enabling smaller, more efficient and lower cost power supplies, without the inclusion of large, expensive flame-rated lenses;

optionally, mitigation of one interface loss by the use of index-matching gel between a solid state light emitter and a primary optic;

optionally, elimination of the packaging cost of LEDs and improved thermal performance (utilizing chip-on-board) without suffering loss of optical performance associated with LED packaging;

versatility of optical configuration, allowing for multiple different optical distributions achievable with different lenses.

The inventive subject matter may be more fully understood with reference to the accompanying drawings and the following detailed description of the inventive subject matter.

BRIEF DESCRIPTION OF THE DRAWING FIGURES

Figure 20:
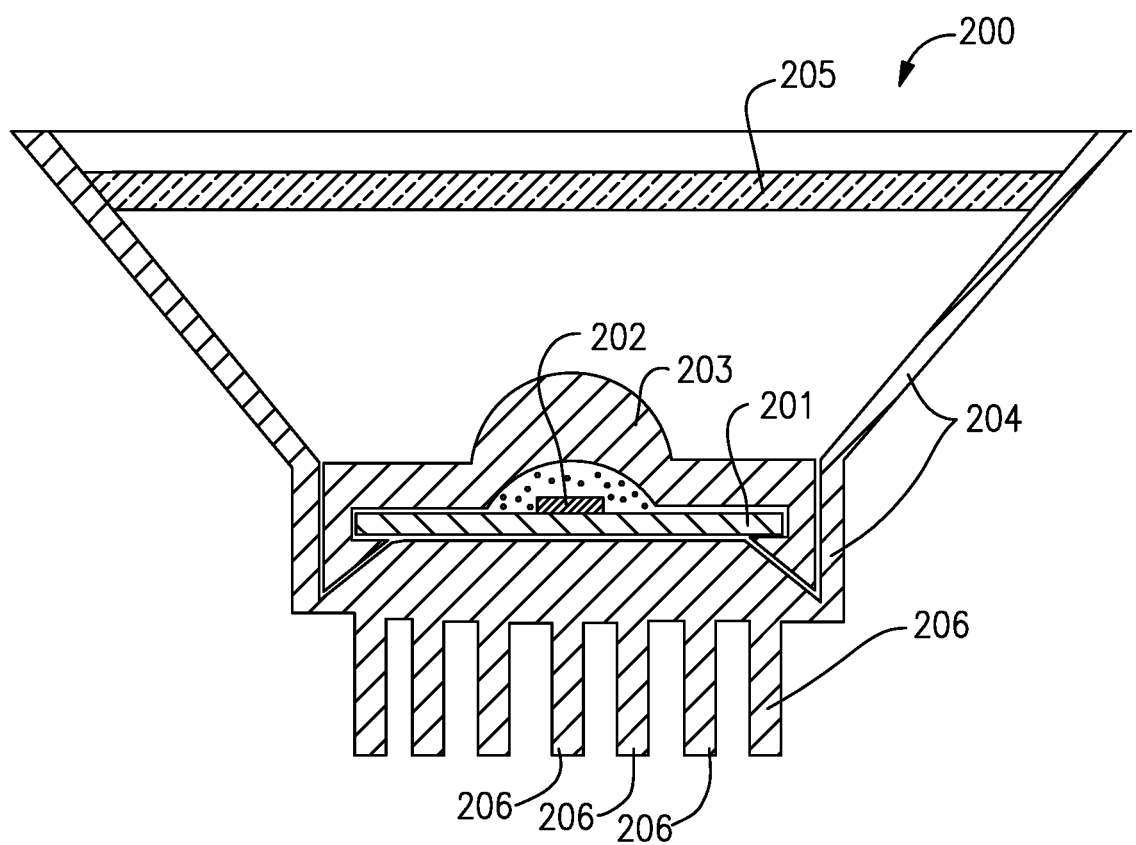

FIG. 20 is a schematic sectional view of a lamp 200 that comprises a circuit board 201, a solid state light emitter 202 on the circuit board 201, an optic 203, a housing 204 and a diffuser 205.

Figure 21:
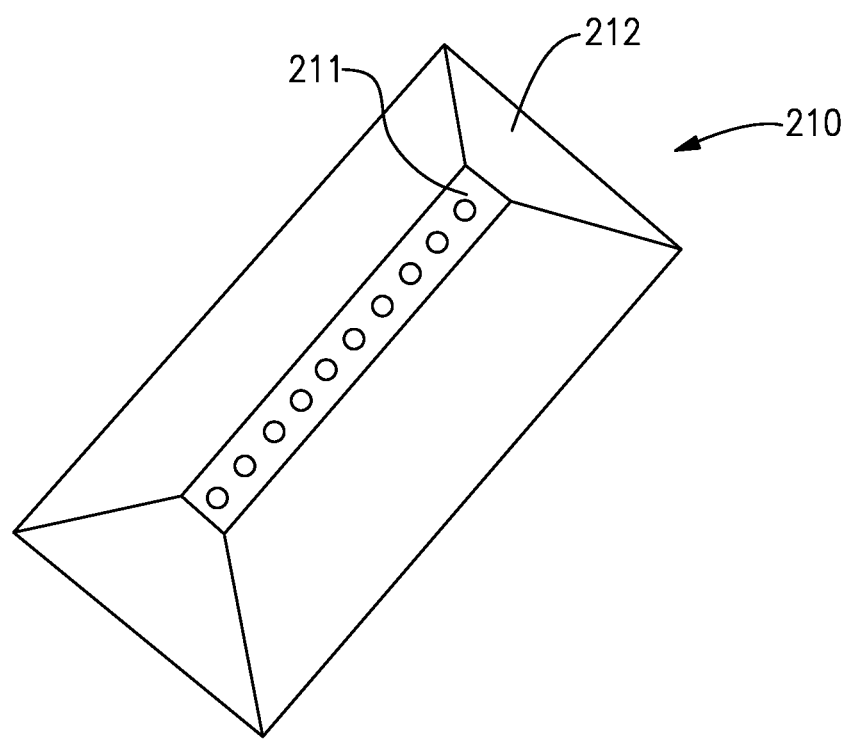

FIG. 21 is a schematic perspective view of a lamp 210 in the form of a linear troffer, comprising a lighting device 211 (which comprises a circuit board with ten light emitting diode chips mounted thereon in a line, and a corresponding optic) and a reflective housing 212.

DETAILED DESCRIPTION

The present inventive subject matter now will be described more fully hereinafter with reference to the accompanying drawings, in which embodiments of the inventive subject matter are shown. However, this inventive subject matter should not be construed as being limited to the embodiments set forth herein. Rather, these embodiments are provided so that this disclosure will be thorough and complete, and will fully convey the scope of the inventive subject matter to those skilled in the art. Like numbers refer to like elements throughout.

As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When an element such as a layer, region or structure is referred to herein as being "on", being mounted "on", being mounted "to", or extending "onto" another element, it can be in or on the other element, and/or it can be directly on the other element, and/or it can extend directly onto the other element, and it can be in direct contact or indirect contact with the other element (e.g., intervening elements may also be present). In contrast, when an element is referred to herein as being "directly on" or extending "directly onto" another element, there are no intervening elements present. Also, when an element is referred to herein as being "attached", "connected" or "coupled" to another element, it can be directly attached, connected or coupled to the other element, or intervening elements may be present. In contrast, when an element is referred to herein as being "directly attached", "directly connected" or "directly coupled" to another element, there are no intervening elements present. In addition, a statement that a first element is "on" a second element is synonymous with a statement that the second element is "on" the first element.

The expression "in contact with", as used herein, means that the first structure that is in contact with a second structure is in direct contact with the second structure or is in indirect contact with the second structure. The expression "in indirect contact with" means that the first structure is not in direct contact with the second structure, but that there are a plurality of structures (including the first and second structures), and each of the plurality of structures is in direct contact with at least one other of the plurality of structures (e.g., the first and second structures are in a stack and are separated by one or more intervening layers). The expression "direct contact", as used in the present specification, means that the first structure which is "in direct contact" with a second structure is touching the second structure and there are no intervening structures between the first and second structures at least at some location.

A statement herein that two components in a device are "electrically connected," means that there are no components electrically between the components that affect the function or functions provided by the device. For example, two components can be referred to as being electrically connected, even though they may have a small resistor between them which does not materially affect the function or functions provided by the device (indeed, a wire connecting two components can be thought of as a small resistor); likewise, two components can be referred to as being electrically connected, even though they may have an additional electrical component between them which allows the device to perform an additional function, while not materially affecting the function or functions provided by a device which is identical except for not including the additional component; similarly, two components which are directly connected to each other, or which are directly connected to opposite ends of a wire or a trace on a circuit board, are electrically connected. A statement herein that two components in a device are "electrically connected" is distinguishable from a statement that the two components are "directly electrically connected", which means that there are no components electrically between the two components.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive subject matter.

Relative terms, such as "bottom", "top", "horizontal" or "vertical" may be used herein to describe one element's relationship to another element (or to other elements) as illustrated in the Figures. Such relative terms are intended to encompass different orientations of the device in addition to the orientation depicted in the Figures. For example, if the device in the Figures is turned over, elements described as being on the "bottom" side would then be oriented on "top" side.

The expression "illumination" (or "illuminated"), as used herein when referring to a light emitter, means that at least some current is being supplied to the light emitter to cause the light emitter to emit at least some electromagnetic radiation (e.g., visible light). The expression "illuminated" encompasses situations where the light emitter emits electromagnetic radiation continuously, or intermittently at a rate such that a human eye would perceive it as emitting electromagnetic radiation continuously or intermittently, or where a plurality of light emitters of the same color or different colors are emitting electromagnetic radiation intermittently and/or alternatingly (with or without overlap in "on" times), e.g., in such a way that a human eye would perceive them as emitting light continuously or intermittently (and, in some cases where different colors are emitted, as separate colors or as a mixture of those colors).

The expression "excited", as used herein when referring to luminescent material, means that at least some electromagnetic radiation (e.g., visible light, UV light or infrared light) is contacting the luminescent material, causing the luminescent material to emit at least some light. The expression "excited" encompasses situations where the luminescent material emits light continuously, or intermittently at a rate such that a human eye would perceive it as emitting light continuously or intermittently, or where a plurality of luminescent materials that emit light of the same color or different colors are emitting light intermittently and/or alternatingly (with or without overlap in "on" times) in such a way that a human eye would perceive them as emitting light continuously or intermittently (and, in some cases where different colors are emitted, as a mixture of those colors).

The expression "lighting device", as used herein, is not limited, except that it indicates that the device is capable of emitting light. That is, a lighting device can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device.

The present inventive subject matter further relates to an illuminated enclosure (the volume of which can be illuminated uniformly or non-uniformly), comprising an enclosed space and at least one lighting device according to the present inventive subject matter, wherein the lighting device illuminates at least a portion of the enclosed space (uniformly or non-uniformly).

The present inventive subject matter is further directed to an illuminated area, comprising at least one item, e.g., selected from among the group consisting of a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, etc., having mounted therein or thereon at least one lighting device as described herein.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. It will also be appreciated by those of skill in the art that references to a structure or feature that is disposed "adjacent" another feature may have portions that overlap or underlie the adjacent feature.

As noted above, in accordance with aspects of the present inventive subject matter, there is provided a lighting device that comprises at least a first circuit board, at least a first solid state light emitter and at least a first optic held in place relative to the first circuit board.

The one or more circuit board in lighting devices in accordance with the present inventive subject matter can generally be any suitable circuit board, a wide variety of which are well known and readily available to persons of skill in the art. Representative examples of suitable circuit boards include metal core printed circuit boards (MCPCB's), FR4 circuit boards and flexible circuit boards (e.g., "flex circuit boards").

The circuit board (or any of the one or more circuit boards) can have features that assist in transferring heat away from the one or more solid state light emitters and/or that assist in dissipating heat generated by the one or more solid state light emitters. For example, persons of skill in the art are familiar with a wide variety of features that can be provided in circuit boards for assisting with heat transfer and/or heat dissipation (e.g., the provision of thermal vias, and/or the inclusion of a metal core in a metal core printed circuit board), and any of such features (or any combination of such features) can be included, as desired, in any circuit board provided in lighting devices in accordance with the present inventive subject matter.

Any suitable solid state light emitter (or solid state light emitters) can be employed in the lighting devices according to the present inventive subject matter. Persons of skill in the art are familiar with, and have ready access to, a wide variety of solid state light emitters. Representative examples of solid state light emitters include light emitting diodes (inorganic or organic, including polymer light emitting diodes (PLEDs)) and a wide variety of luminescent materials as well as combinations (e.g., one or more light emitting diodes and/or one or more luminescent materials).

A light emitting diode (if included in a lighting device in accordance with the present inventive subject matter) can be in any suitable form, e.g., a light emitting diode can be provided as an LED (e.g., a packaged LED) on a substrate (which in turn is on a circuit board), a light emitting diode can be provided as a light emitting diode chip on a substrate (which in turn is on a circuit board), or a light emitting diode can be provided as a light emitting diode chip on a circuit board (i.e., chip-on-board), each of which are well known to persons of skill in the art. A solid state light emitter can comprise a lateral device (e.g., a lateral chip), i.e., a device in which both electrical contacts are on one side of the device or a vertical device (e.g., a vertical chip), i.e., a device in which electrical contacts are on opposite sides of the device, or electrical contacts can be in any suitable arrangement. Electricity can be supplied to a solid state light emitter in any suitable way, e.g., using contacts, wire bonds, etc.

In some embodiments in accordance with the present inventive subject matter, once the steps have been taken to include an index-matching material and utilize a flame-rated lens as a primary optic, employing a chip-on-board solution can eliminate substrate cost and molding cost on the one or more solid state light emitters (e.g., individual LEDs), and can remove a thermal interface between the LED chip and the outside environment. Thus, a low cost, high thermal and optical performance method of implementing high voltage power supplies and LEDs into a general illumination system can be obtained.

As noted above, in some embodiments in accordance with the present inventive subject matter, a solid state light emitter can comprise a plurality of light emitting devices formed by depositing stacked active layers on a wafer and/or substrate, and then isolating respective regions of those stacked layers from each other to provide a plurality of light emitting devices which are mechanically connected to one another. In some of such embodiments, the solid state light emitter can have a voltage drop of at least 60 volts (in some embodiments, a voltage drop of at least 42.4 volts), and/or the voltage supplied to the lighting device in which the light emitter is included can be at least 60 volts (or at least 42.4 volts).

The solid state light emitter(s) in any lighting device according to the present inventive subject matter can be of any suitable size (or sizes), e.g., and any quantity (or respective quantities) of solid state light emitters of one or more sizes can be employed. In some instances, for example, a greater quantity of smaller solid state light emitters can be substituted for a smaller quantity of larger solid state light emitters, or vice-versa.

Light emitting diodes are semiconductor devices that convert electrical current into light. A wide variety of light emitting diodes are used in increasingly diverse fields for an ever-expanding range of purposes. More specifically, light emitting diodes are semiconducting devices that emit light (ultraviolet, visible, or infrared) when a potential difference is applied across a p-n junction structure. There are a number of well known ways to make light emitting diodes and many associated structures, and the present inventive subject matter can employ any such devices.

A light emitting diode produces light by exciting electrons across the band gap between a conduction band and a valence band of a semiconductor active (light-emitting) layer. The electron transition generates light at a wavelength that depends on the band gap. Thus, the color of the light (wavelength) and/or the type of electromagnetic radiation (e.g., infrared light, visible light, ultraviolet light, near ultraviolet light, etc., and any combinations thereof) emitted by a light emitting diode depends on the semiconductor materials of the active layers of the light emitting diode.

The expression "light emitting diode" is used herein to refer to the basic semiconductor diode structure (i.e., the chip). The commonly recognized and commercially available "LED" that is sold (for example) in electronics stores typically represents a "packaged" device made up of a number of parts. These packaged devices typically include a semiconductor based light emitting diode such as (but not limited to) those described in U.S. Pat. Nos. 4,918,487; 5,631,190; and 5,912,477; various wire connections, and a package that encapsulates the light emitting diode.

A luminescent material is a material that emits a responsive radiation (e.g., visible light) when excited by a source of exciting radiation. In many instances, the responsive radiation has a wavelength (or hue) that is different from the wavelength (or hue) of the exciting radiation.

Luminescent materials can be categorized as being down-converting, i.e., a material that converts photons to a lower energy level (longer wavelength) or up-converting, i.e., a material that converts photons to a higher energy level (shorter wavelength).

Persons of skill in the art are familiar with, and have ready access to, a variety of luminescent materials that emit light having a desired peak emission wavelength and/or dominant emission wavelength, or a desired hue, and any of such luminescent materials, or any combinations of such luminescent materials, can be employed, if desired. One type of luminescent material are phosphors, which are readily available and well known to persons of skill in the art. Other examples of luminescent materials include scintillators, day glow tapes and inks that glow in the visible spectrum upon illumination with ultraviolet light.

One non-limiting representative example of a luminescent material that can be employed in the present inventive subject matter is cerium-doped yttrium aluminum garnet (aka "YAG: Ce" or "YAG"). Another non-limiting representative example of a luminescent material that can be employed in the present inventive subject matter is CaAlSiN:Eu2+(aka "CASN" or "BR01"), and a further example of a type of luminescent material is BOSE.

The one or more luminescent materials can be provided in any suitable form. For example, the luminescent element can be embedded in a resin (i.e., a polymeric matrix), such as a silicone material, an epoxy material, a glass material or a metal oxide material, and/or can be applied to one or more surfaces of a resin, to provide a lumiphor.

The solid state light emitter (or solid state light emitters) can be arranged in any suitable way. Persons of skill in the art will readily identify a large number of different possible arrangements, any of which (or any combination of which) can be employed in the lighting devices according to the present inventive subject matter.

The solid state light emitter (or the solid state light emitters) can be positioned in any suitable way. In some embodiments, for example, the solid state light emitter (or the solid state light emitters), or some of two or more solid state light emitters, can be on one or more circuit boards (which can be positioned in any suitable way).

One or more solid state light emitters can be positioned, attached and/or mounted in any suitable way, e.g., by using chip on heat sink mounting techniques, by soldering (e.g., if a solid state light emitter is mounted on a metal core printed circuit board (MCPCB), flex circuit or even a standard PCB, such as an FR4 board with thermal vias), for example, solid state light emitters can be mounted using substrate techniques such as from Thermastrate Ltd of Northumberland, UK. If desired, a surface of a structure on which the solid state light emitter is mounted, attached or positioned, and/or the one or more solid state light emitters can be machined or otherwise formed to be of matching topography so as to provide high heat sink surface area.

The one or more optic in lighting devices in accordance with the present inventive subject matter can generally be made of any suitable material, and can be in any suitable shape. Persons of skill in the art are familiar with a large number of materials (and combinations of materials) that can be used to make optics for use in making enclosures (or components thereof) that are flame-rated or that are not flame-rated. For example, persons of skill in the art are familiar with a variety of polycarbonate materials which are UL 94 V0 rated and which can be used to make light passing structures which are substantially transparent and which pass the UL 94 5VA 5 inch flame test (for instance, such materials are available from Bayer MaterialScience, Teijin Chemicals Ltd., Kingfa Science and Technology Co., Ltd. and E.I. DuPont. de Nemours & Co., to name a few). Persons of skill in the art are also familiar with a variety of PMMA materials which are not UL 94 W0 rated, and which can be used in making enclosures that are not flame-rated.

Persons of skill in the art are familiar with an enormous range of optical structures and optical features that can be provided in an optic, and any of such optical structures and optical features (and combinations thereof) can be provided in optics for lighting devices in accordance with the present inventive subject matter.

As used herein, the expression "optical feature" refers to a three dimensional shape that has a contour that differs from the contour of the immediate surroundings, or to a pattern of shapes that has a contour that differs from the contour of the immediate surrounding. The size of such contour can be nano, micro, or macro in size or scale. A pattern of optical features can be any suitable pattern for providing a desired diffusion and/or mixing of light. The pattern can be repeating, pseudo-random or random. The expression "pseudo-random" means a pattern that includes one or more types of random sub-patterns which are repeated. The expression "random" means a pattern that does not include any substantial regions which are repeated. Persons of skill in the art are familiar with a wide variety of optical features as defined herein, and any such optical features can be employed in the lighting devices according to the present inventive subject matter.

In some embodiments, at least a portion of the optic (or one or more of plural optics) is substantially transparent. The expression "substantially transparent", as used herein, means that the structure (or portion thereof) that is characterized as being substantially transparent ultimately (i.e., light that is internally reflected one or more times and that eventually exits is considered to have passed through the optic, even if it exits to the same side of the optic that it entered) allows passage of at least 90% of incident visible light.

The optic (or one or more of plural optics, if provided) can be held in place (permanently or removably) relative to a circuit board in any suitable way. For example, one suitable way for an optic to be held in place relative to a circuit board is by providing on the optic a region (e.g., a post) that is configured to be pushed through an aperture in the circuit board and then shaped (e.g., using heat so that it becomes at least soft enough to be mushroomed) so that it cannot be retracted back through the aperture. Another suitable way for an optic to be held in place relative to a circuit board is by using flexible structures that comprise regions (1) which can be moved by force (e.g, by bending the flexible structures) to allow a circuit board to be inserted between the flexible structures, and (2) which hold the circuit board in place relative to the optic which the force is removed. In other embodiments, for example, an optic can be held in place relative to a circuit board (1) by providing threads on an internal surface of a raised edge around the perimeter of the optic which can be threadedly engaged in corresponding threads provided in an edge surface of the circuit board, (2) by providing threads on an edge surface of the optic which can be threadedly engaged in corresponding threads provided in an internal surface of a raised edge surface of the circuit board, (3) by providing a clip (or clips) on the optic which engage the circuit board, (4) by providing a clip (or clips) on the circuit board which engage the optic, (5) by providing a pin (or pins) on the optic which fits into a recess (or recesses) provided on the circuit board, (6) by providing a pin (or pins) on the circuit board which fits into a recess (or recesses) provided on the optic, (7) using screws, bolts, rivets, etc. that extend through at least a portion of the optic and at least a portion of the circuit board, (8) using adhesive, (9) through geometry (e.g., an external frustoconical surface on the circuit board engages an internal frustoconical surface on the optic, (10) by press fitting at least a portion of the circuit board in a recess in the optic, (11) by press fitting at least a portion of the optic in a recess in the circuit board, (12) by a ridge and groove (e.g., a ridge on an edge of the circuit board that fits into a groove or a recess in the optic, or a ridge on an edge of a recess in the optic that fits into a groove on the circuit board), (13) by an arrangement in which a tab on one element fits into a slot on the other element and optionally the elements are then moved relative to one another (e.g., one element is slid or rotated relative to the other), (14) by compression (e.g., by heating the optic and inserting the circuit board into a recess (in which the circuit board fits snugly) in the optic, so that when the optic cools down, the circuit board will be compressed within the recess) etc.

As noted above, in some embodiments in accordance with the present inventive subject matter, one or more luminescent materials can be provided in and/or on the optic (or on one or more optic), e.g., a luminescent material can be dispersed within at least a first region of an optic.

In making lighting devices in accordance with the present inventive subject matter, large areas of structures can be made, which can later be broken into component pieces, if desired. For example, it would be possible to make a ten-by-ten array of solid state light emitters and/or a corresponding optic, and then break the array and/or the optic into ten strips (each with ten solid state light emitters). In instances where such a capability is desired, features, e.g., perforations, can be provided to facilitate such breakage.

In some instances, contacts can be provided on any of the structures described herein (e.g., on sides of circuit boards) in order to facilitate electrical connection to one or more other structures.

As noted above, in some embodiments in accordance with the present inventive subject matter, a lighting device can further comprise at least a first index-matching element between at least a portion of a first solid state light emitter and a first optic. In general, an index-matching element (or at least a portion thereof) should have an index of refraction of a value that is between the value for the index of refraction of the first solid state light emitter and the value for the index of refraction of the first optic. Persons of skill in the art are familiar with a wide variety of materials that can be used to make index-matching elements of specific index of refraction values (and that are substantially transparent). An index-matching element can comprise solid material, liquid material, gel, gaseous material and/or plasma material.

An index-matching element, when included, can be of generally any suitable shape. In some embodiments, an index-matching element substantially fills a space between a first solid state light emitter and a first optic, i.e., a first region of the index-matching element can be in direct contact with the first solid state light emitter and a second region of the index-matching element can be in direct contact with the first optic.

In some embodiments in accordance with the present inventive subject matter, an index-matching element is provided (or a plurality of index-matching elements are provided), and the index-matching element (or one of more of the index-matching elements) comprises one or more luminescent materials, e.g., a luminescent material can be dispersed within at least a first region of an index-matching element. In some of such embodiments, which can include or not include, as suitable, any of the other features described herein, the index-matching element comprises at least a first luminescent material.

As noted above, in some embodiments in accordance with the present inventive subject matter, a lighting device can comprise at least one power supply, which can be isolated or which can be non-isolated. A power supply (if included) in a lighting device in accordance with the present inventive subject matter can comprise any electronic components that are suitable for a lighting device, for example, any of (1) one or more electrical components employed in converting electrical power (e.g., from AC to DC and/or from one voltage to another voltage), (2) one or more electronic components employed in driving one or more light emitter, e.g., running one or more light emitter intermittently and/or adjusting the current supplied to one or more light emitters in response to a user command, a detected change in intensity or color of light output, a detected change in an ambient characteristic such as temperature or background light, etc., and/or a signal contained in the input power (e.g., a dimming signal in AC power supplied to the lighting device), etc., (3) one or more circuit boards (e.g., a metal core circuit board) for supporting and/or providing current to any electrical components, and/or (4) one or more wires connecting any components (e.g., connecting an Edison socket to a circuit board), etc., e.g. electronic components such as linear current regulated supplies, pulse width modulated current and/or voltage regulated supplies, bridge rectifiers, transformers, power factor controllers etc. A power supply (if included) can comprise any suitable circuitry configuration, e.g., a boost configuration and/or a buck configuration, persons of skill in the art being very familiar with a wide variety of such configurations and readily being able to assemble such configurations.

In some embodiments in accordance with the present inventive subject matter, which can include or not include, as suitable, any of the other features described herein, the lighting device can further comprise a housing. The housing (if included) can generally be of any suitable shape and size, and can be made out of any suitable material or materials. Representative examples of materials that can be used in making a housing include, among a wide variety of other materials, extruded aluminum, powder metallurgy formed aluminum, die cast aluminum, liquid crystal polymer, polyphenylene sulfide (PPS), thermoset bulk molded compound or other composite material. In some embodiments in accordance with the present inventive subject matter, which can include or not include, as suitable, any of the other features described herein, a housing (if included) can comprise a material that can be molded and/or shaped, and/or it can comprise a material that is an effective heat sink (i.e., which has high thermal conductivity and/or high heat capacity).

In some aspects of the present inventive subject matter, which can include or not include any of the features described elsewhere herein, there are provided lighting devices that provide good heat dissipation (e.g., in some embodiments, sufficient that one or more solid state light emitter in the lighting device can continue to provide at least 70% of its initial wall plug efficiency for at least 25,000 hours of operation of the lighting device, and in some cases for at least 35,000 hours or 50,000 hours of operation of the lighting device).

In some embodiments in accordance with the present inventive subject matter, there can be provided one or more heat dissipation elements. A heat dissipation element, if employed, can be made of any suitable material, and can be of any suitable shape. In some embodiments, a heat transfer element has high thermal conductivity characteristics, e.g., it has a thermal conductivity of at least 1 W/m-K. Representative examples of materials that are suitable for making a heat transfer element include, among a wide variety of other materials, extruded aluminum, powder metallurgy formed aluminum, die cast aluminum, liquid crystal polymer, polyphenylene sulfide (PPS), thermoset bulk molded compound or other composite material. For example, some embodiments in accordance with the present inventive subject matter comprise a lighting device that comprises one or more solid state light emitters on a circuit board, the circuit board in turn on a housing made of a material that has high thermal conductivity (e.g., comprising aluminum, metal alloys, ceramics, polymers mixed with ceramic or metal or metalloid particles, etc.) and that can comprise one or more heat dissipation structures, e.g., fins, heat pipes. Heat transfer from one structure or region of a lighting device to another can be enhanced (i.e., thermal resistivity can be reduced or minimized) using any suitable material or structure for doing so, a variety of which are known to persons of skill in the art, e.g., by means of chemical or physical bonding and/or by interposing a heat transfer aid such as a thermal pad, thermal grease, graphite sheets, heat spreaders, thermal transfer regions (e.g., comprising metals, diamond, DLC), etc.

Some embodiments of lighting devices according to the present inventive subject matter have passive cooling, and some embodiments of lighting devices according to the present inventive subject matter have active cooling as well as passive cooling. The expression "active cooling" is used herein in a manner that is consistent with its common usage to refer to cooling that is achieved through the use of some form of energy, as opposed to "passive cooling", which is achieved without the use of energy (i.e., while energy is supplied to the one or more solid state light emitters, passive cooling is the cooling that would be achieved without the use of any component(s) that would require additional energy in order to function to provide additional cooling).

One or more structures in some embodiments of lighting devices in accordance with the present inventive subject matter can comprise any suitable texturing, e.g., ridges, valleys, roughened regions, nodules, protrusions, indentations, etc., e.g., to increase the surface area of heat dissipation.

Some embodiments of lighting devices in accordance with the present inventive subject matter (which can include or not include any of the features described elsewhere herein) can include one or more lenses, diffusers or light control elements. Persons of skill in the art are familiar with a wide variety of lenses, diffusers and light control elements, can readily envision a variety of materials out of which a lens, a diffuser, or a light control element can be made (e.g., polycarbonate materials, acrylic materials, fused silica, polystyrene, etc.), and are familiar with and/or can envision a wide variety of shapes that lenses, diffusers and light control elements can be. Any of such materials and/or shapes can be employed in a lens and/or a diffuser and/or a light control element in an embodiment that includes a lens and/or a diffuser and/or a light control element. As will be understood by persons skilled in the art, a lens or a diffuser or a light control element in a lighting device according to the present inventive subject matter can be selected to have any desired effect on incident light (or no effect), such as focusing, diffusing, etc. Any such lens and/or diffuser and/or light control element can comprise one or more luminescent materials, e.g., one or more phosphor.

In embodiments in accordance with the present inventive subject matter that include a lens (or plural lenses), a diffuser (or plural diffusers) and/or a light control element (or plural light control elements), the lens (or lenses), diffuser (or diffusers) and/or light control element (or light control elements) can be positioned in any suitable location and orientation.

In some embodiments according to the present inventive subject matter, solid state light emitters are electrically with enough solid state light emitters (or devices) arranged in series to match (or to come close to matching) the voltage supplied from to the solid state light emitters (e.g., in some embodiments, the DC voltage obtained by rectifying line AC current and supplying it to the solid state light emitters via a power supply). For instance, in some embodiments, sixty-eight solid state light emitters and/or devices (or other numbers, as needed to match the line voltage)(and any of the sixty-eight solid state light emitters can comprise a number of light emitters and/or devices arranged in parallel) can be arranged in series, so that the voltage drop across the entire series is about 162 volts. Providing such matching can help provide power supply efficiencies and thereby boost the overall efficiency of the lighting device. In such lighting devices, total lumen output can be regulated by adjusting the current supplied to the series of solid state light emitters.

Some embodiments in accordance with the present inventive subject matter can comprise a power line that can be connected to a source of power (such as a branch circuit, an electrical outlet, a battery, a photovoltaic collector, etc.) and that can supply power to a lighting device. Persons of skill in the art are familiar with, and have ready access to, a variety of structures that can be used as a power line. A power line can be any structure that can carry electrical energy and supply it to a lighting device according to the present inventive subject matter.

A lighting device in accordance with the present inventive subject matter can comprise an electrical connector. An electrical connector, if included, can be attached to one or more other components of the lighting device in any suitable way, e.g., by screw-threading into another component (e.g., a housing member, if included, or a lens, if included), with screws (or bolts or rivets), with clips, with adhesive (e.g., thermal paste), by compression, by press fitting, by a ridge and groove, or by an arrangement in which a tab on one element fits into a slot on the other element and then the elements are moved relative to one another (e.g., one element is slid or rotated relative to the other).

Various types of electrical connectors are well known to those skilled in the art, and any of such electrical connectors can be attached within (or attached to) the lighting devices according to the present inventive subject matter. Representative examples of suitable types of electrical connectors include wires (for splicing to a branch circuit), Edison plugs (which are receivable in Edison sockets) and GU24 pins (which are receivable in GU24 sockets). Other well known types of electrical connectors include 2-pin (round) GX5.3, can DC bay, 2-pin GY6.35, recessed single contact R7s, screw terminals, 4 inch leads, 1 inch ribbon leads, 6 inch flex leads, 2-pin GU4, 2-pin GU5.3, 2-pin G4, turn & lock GU7, GU10, G8, G9, 2-pin Pf, min screw E10, DC bay BA15d, min cand E11, med screw E26, mog screw E39, mogul bipost G38, ext. mog end pr GX16d, mod end pr GX16d and med skirted E26/50x39 (see https://www.gecatalogs.com/lighting/software/GELightingCatalogSetup.exe).

In some embodiments, drive circuitry can be provided to achieve some degree of power factor correction. Persons of skill in the art are familiar with a variety of power factor controllers (PFCs), and any of such power factor controllers can be employed, if desired, in the lighting devices in accordance with the present inventive subject matter. In some embodiments, there can be provided a lighting device that may have a power factor of greater than 0.7 and in some embodiments a power factor of greater than 0.9. In some embodiments, a lighting device can have a power factor of greater than 0.5. Such embodiments may not require power factor correction and, therefore, may be less costly and smaller in size. Additionally, drive circuitry may be provided for dimming a lighting device.

Energy can be supplied to a lighting device in accordance with the present inventive subject matter from any source or combination of sources, for example, the grid (e.g., line voltage), one or more batteries, one or more photovoltaic energy collection devices (i.e., a device that includes one or more photovoltaic cells that convert energy from the sun into electrical energy), one or more windmills, etc.

In some embodiments according to the present inventive subject matter, including some embodiments that include or do not include any of the features as discussed herein, the lighting device has a wall plug efficiency of at least 25 lumens per watt, in some cases at least 35 lumens per watt, in some cases at least 50 lumens per watt, in some cases at least 60 lumens per watt, in some cases at least 70 lumens per watt, and in some cases at least 80 lumens per watt.

The expression "wall plug efficiency", as used herein, is measured in lumens per watt, and means lumens exiting a lighting device, divided by all energy supplied to create the light, as opposed to values for individual components and/or assemblies of components. Accordingly, wall plug efficiency, as used herein, accounts for all losses, including, among others, any quantum losses, i.e., losses generated in converting line voltage into current supplied to light emitters, the ratio of the number of photons emitted by luminescent material(s) divided by the number of photons absorbed by the luminescent material(s), any Stokes losses, i.e., losses due to the change in frequency involved in the absorption of light and the re-emission of visible light (e.g., by luminescent material(s)), and any optical losses involved in the light emitted by a component of the lighting device actually exiting the lighting device. In some embodiments, the lighting devices in accordance with the present inventive subject matter provide the wall plug efficiencies specified herein when they are supplied with AC power (i.e., where the AC power is converted to DC power before being supplied to some or all components, the lighting device also experiences losses from such conversion), e.g., AC line voltage. The expression "line voltage" is used in accordance with its well known usage to refer to electricity supplied by an energy source, e.g., electricity supplied from a grid, including AC and DC.

In some embodiments of this type, there are provided lighting devices that provide lumen output of at least 600 lumens, and in some embodiments at least 750 lumens, at least 900 lumens or at least 1100 lumens (or in some cases at least even higher lumen outputs)

Embodiments in accordance with the present inventive subject matter are described herein in detail in order to provide exact features of representative embodiments that are within the overall scope of the present inventive subject matter. The present inventive subject matter should not be understood to be limited to such detail.

Embodiments in accordance with the present inventive subject matter are also described with reference to cross-sectional (and/or plan view) illustrations that are schematic illustrations of idealized embodiments of the present inventive subject matter. As such, variations from the shapes of the illustrations as a result, for example, of manufacturing techniques and/or tolerances, are to be expected. Thus, embodiments of the present inventive subject matter should not be construed as being limited to the particular shapes of regions illustrated herein but are to include deviations in shapes that result, for example, from manufacturing. For example, a molded region illustrated or described as a rectangle will, typically, have rounded or curved features. Thus, the regions illustrated in the figures are schematic in nature and their shapes are not intended to illustrate the precise shape of a region of a device and are not intended to limit the scope of the present inventive subject matter.

The lighting devices illustrated herein are in some cases illustrated with reference to cross-sectional drawings. These cross sections may be rotated around a central axis to provide lighting devices that are circular in nature. Alternatively, the cross sections may be replicated to form sides of a polygon, such as a square, rectangle, pentagon, hexagon or the like, to provide a lighting device. Thus, in some embodiments, objects in a center of the cross-section may be surrounded, either completely or partially, by objects at the edges of the cross-section.

Figure 1:
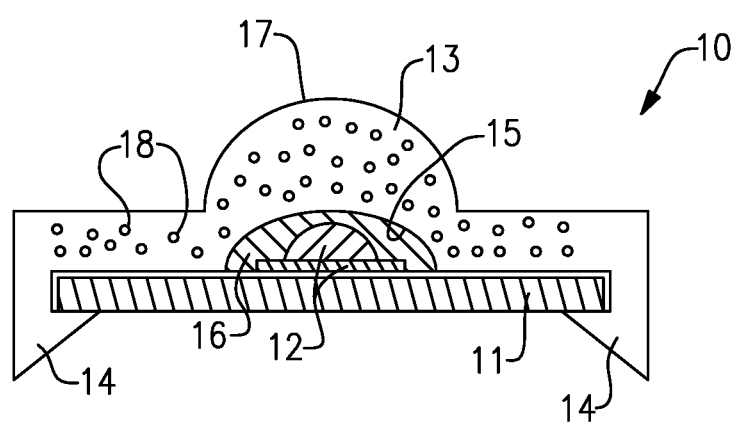
FIG. 1 is a schematic cross-sectional view of a lighting device 10 according to the present inventive subject matter.

FIG. 1 is a schematic cross-sectional view of a lighting device according to the present inventive subject matter. Referring to FIG. 1, there is shown a lighting device 10 that comprises a circuit board 11, a solid state light emitter 12 on the circuit board 11 and a flame-rated optic 13. The optic 13 comprises snap features 14 which hold the optic 13 in place relative to the circuit board 11 (which comprises six sides, each side substantially parallel to one other of the sides and substantially perpendicular to four other of the sides). The optic 13 also can comprise one or more optical features; in this embodiment, the optic 13 comprises a dome region 17.

Referring to FIG. 1, the solid state light emitter 12 is between a portion of the circuit board 11 and a portion of the first optic 13. When the solid state light emitter 12 is illuminated, at least a portion of light emitted by the solid state light emitter 12 passes through the optic 13.

In this particular embodiment, the solid state light emitter 12 is a packaged LED, and the voltage drop across the solid state light emitter 12 is at least 60 volts.

Referring to FIG. 1, a cavity 15 is defined between the optic 13 and the circuit board 11. The solid state light emitter 12 is in the cavity 15. In addition, the lighting device 10 can further comprise an index-matching element 16 in the cavity 15, between the solid state light emitter 12 and the optic 13. In this embodiment, the index-matching element 16 and the solid state light emitter 12 together substantially fill the cavity 15.

In this embodiment, a first luminescent material 18 is dispersed within the optic 13.

In this embodiment, a thickness of the lighting device (in the vertical direction in the orientation depicted in FIG. 1) is not larger than about 2 mm, and a width of the lighting device (in the horizontal direction in the orientation depicted in FIG. 1) is not larger than about 6 mm.

Figure 2:
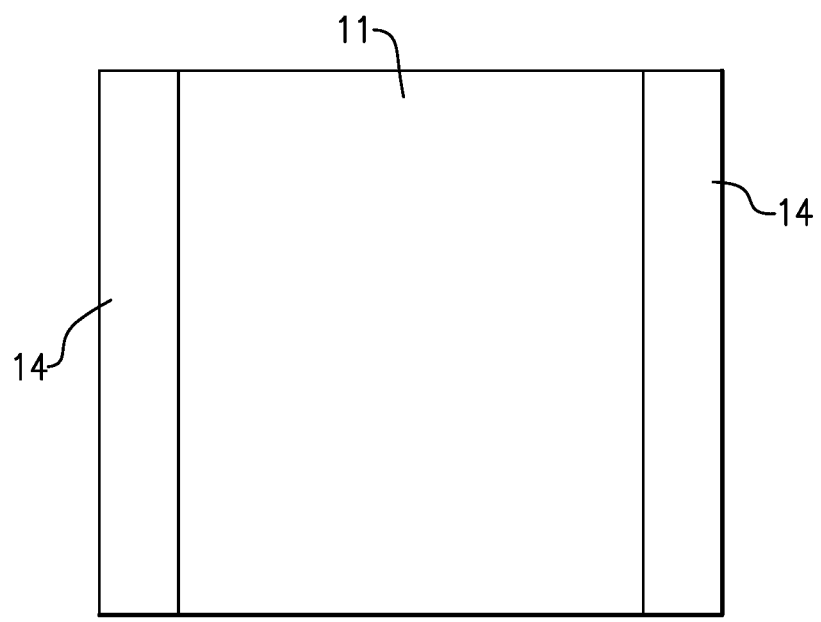
FIG. 2 is a schematic bottom view of the lighting device 10.

FIG. 2 is a schematic bottom view of the lighting device 10, showing the regions of the bottom of the circuit board 11 that are overlapped by the snap features 14 of the optic 13.

Figure 3:
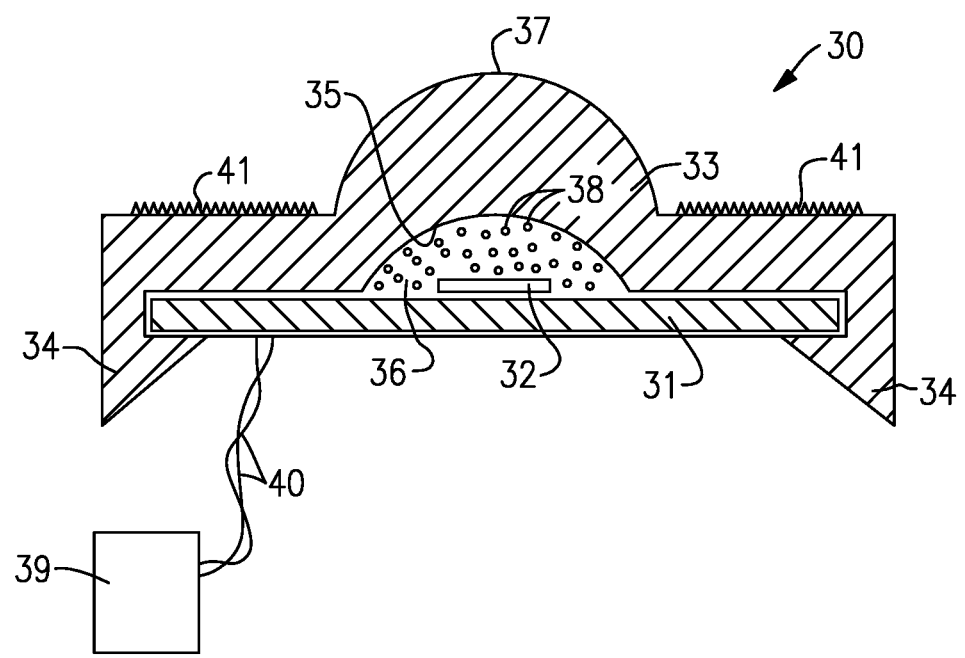
FIG. 3 is a schematic cross-sectional view of a lighting device according to the present inventive subject matter.

FIG. 3 is a schematic cross-sectional view of a lighting device according to the present inventive subject matter. Referring to FIG. 3, there is shown a lighting device 30 that comprises a circuit board 31, a solid state light emitter 32 on the circuit board 31 and a flame-rated optic 33. The optic 33 comprises snap features 34 which hold the optic 33 in place relative to the circuit board 31. The optic 33 also can comprise one or more optical features; in this embodiment, the optic 33 comprises a dome region 37 and a roughened region 41.

In this particular embodiment, the solid state light emitter 32 is a light emitting diode chip, mounted directly on the circuit board 31 (i.e., in a chip-on-board arrangement), and the voltage drop across the solid state light emitter 32 is at least 60 volts.

A cavity 35 is defined between the optic 33 and the circuit board 31. The solid state light emitter 32 is in the cavity 35. In addition, the lighting device 30 can further comprise an index-matching element 36 in the cavity 35.

In this embodiment, a first luminescent material 38 is dispersed within the index-matching element 36.

This embodiment further comprises a non-isolated power supply 39 which supplies electricity to the lighting device 30 through wires 40.

Figure 4:
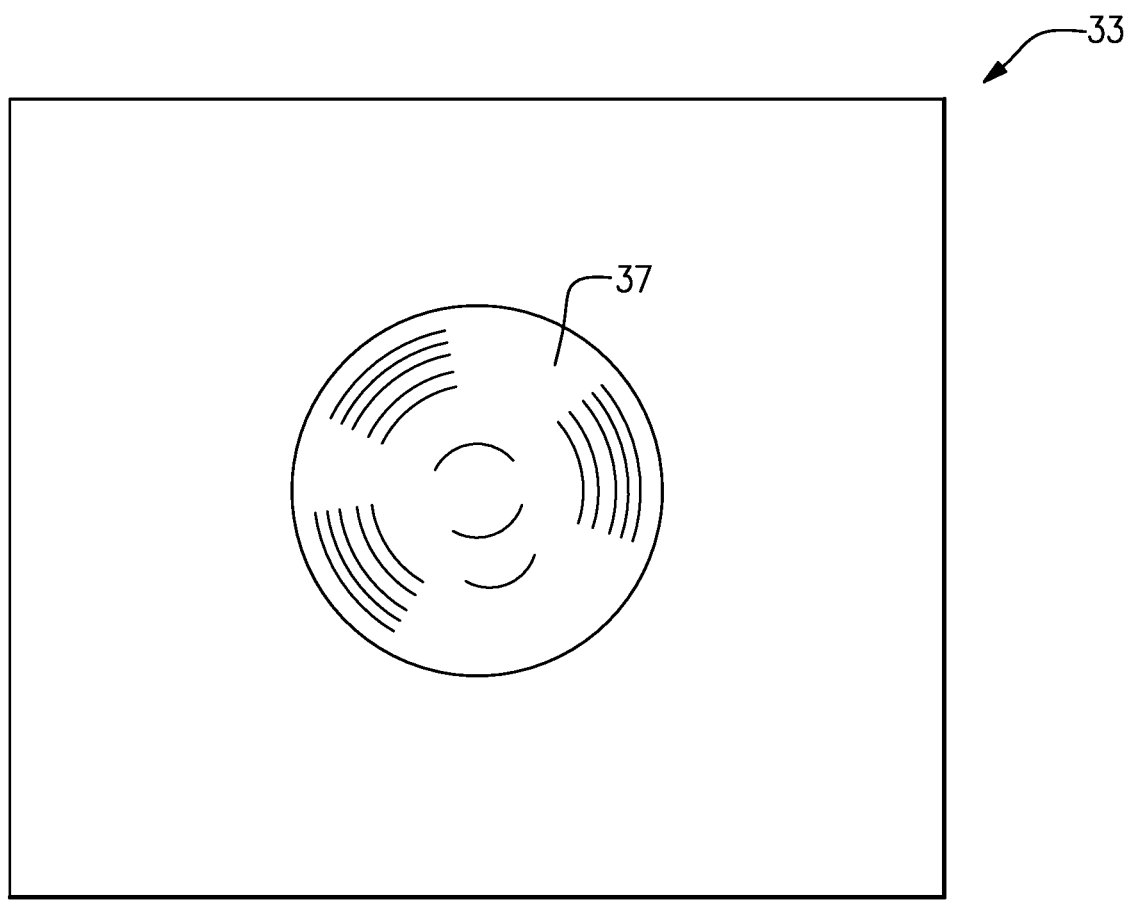
FIG. 4 is a schematic top view of an optic 33 according to the present inventive subject matter.
Figure 5:
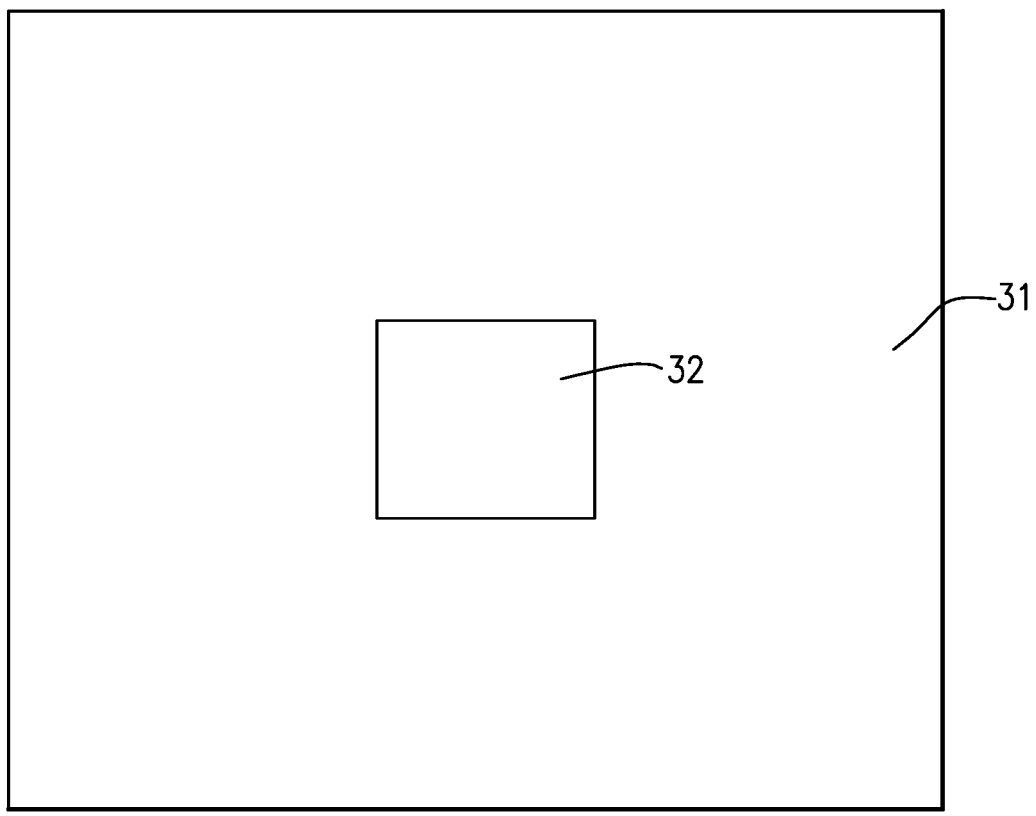
FIG. 5 is a schematic top view of a solid state light emitter on a circuit board.

FIG. 4 is a schematic top view of the optic 33, showing the dome 37. FIG. 5 is a schematic top view of the solid state light emitter 32 on the circuit board 31. From a comparison of FIGS. 4 and 5, the relative positioning of the chip 32 and the dome 37 of the optic 33 can be seen. The spatial relationship between the chip 32 and the dome 37 depicted in FIGS. 3-5, and the respective shapes of the chip 32 and the optic 33, are representative, and persons of skill in the art can envision an enormous number of possible spatial relationships and respective shapes, all of which are within the scope of the present inventive subject matter.

Figure 6:
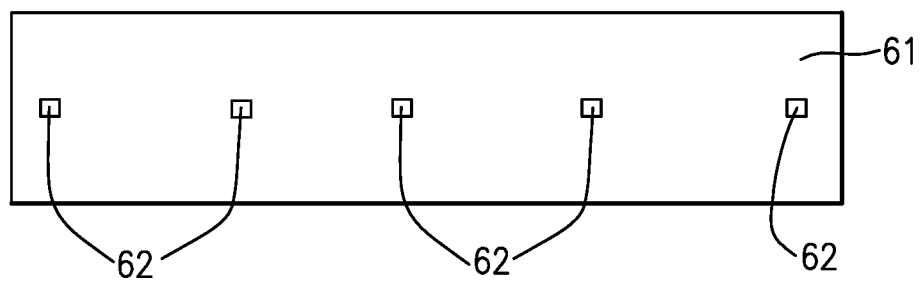
FIG. 6 is a schematic top view of an alternative circuit board 61 on which five light emitting diode chips 62 are mounted (chip-on-board).
Figure 7:
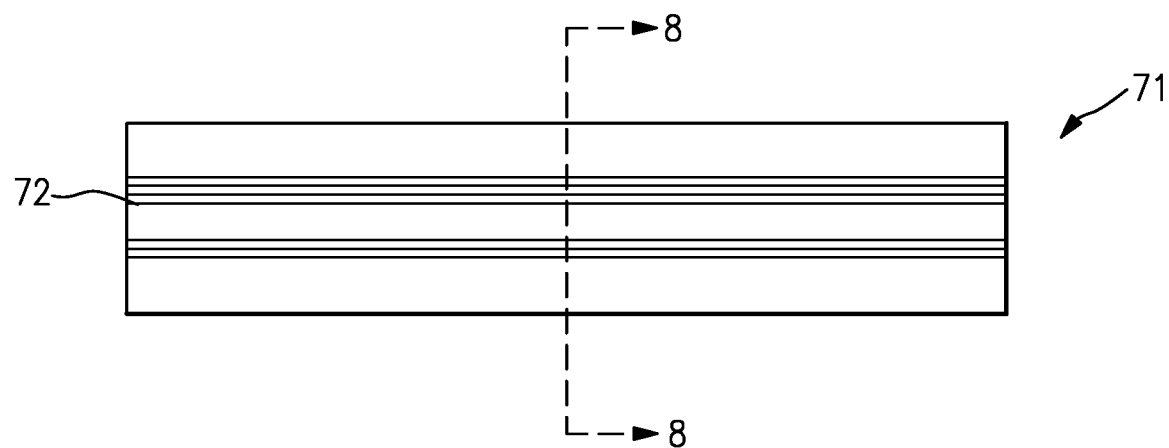
FIG. 7 is a schematic top view of an alternative optic 71 for use with the circuit board 61 depicted in FIG. 6.
Figure 8:
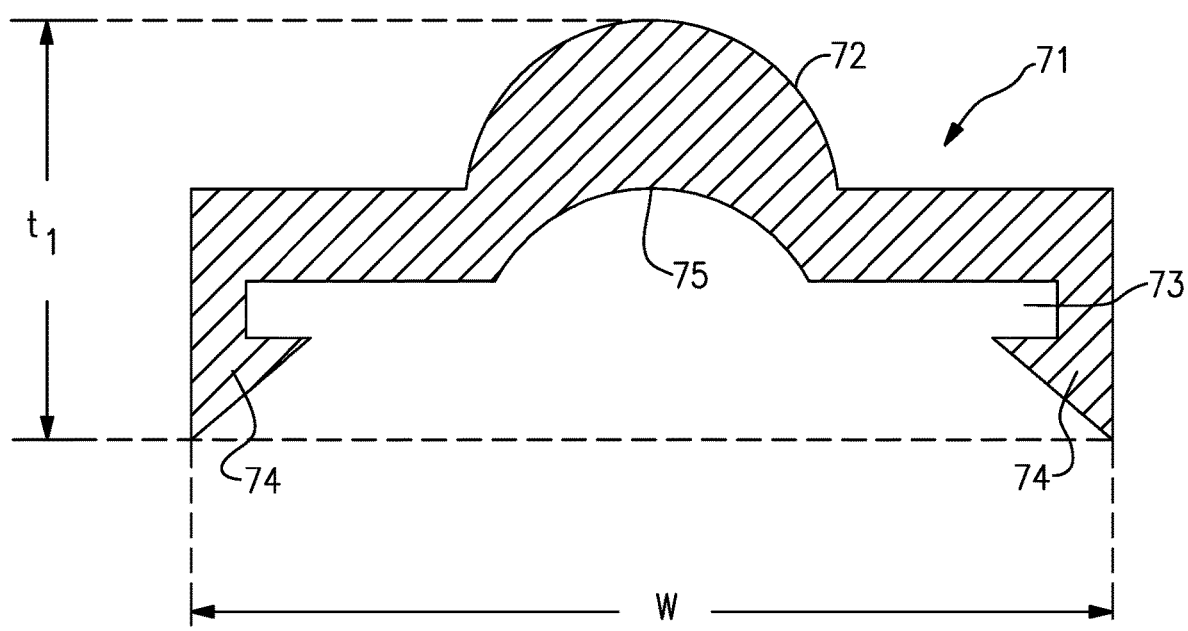
FIG. 8 is a schematic cross-sectional view of the optic 71, taken along the plane 8-8 in FIG. 7.

FIG. 6 is a schematic top view of an alternative circuit board 61 on which five light emitting diode chips 62 are mounted (chip-on-board), and FIG. 7 is a schematic top view of an alternative optic 71 for use with the circuit board 61 depicted in FIG. 6. FIG. 8 is a schematic cross-sectional view of the optic 71, taken along the plane 8-8 in FIG. 7. As seen in FIGS. 7 and 8, the optic 71 comprises a continuous optical feature 72 which comprises a curved region and which extends along the long dimension of the optic 71. The optic 71 also comprises a curved region 75, i.e., the optic comprises at least one curved region on each of two opposite sides. The circuit board 61 can be received in the region 73 defined by the optic 71, and can be held in place by snap features 74 which extend along the long dimension of the optic 71 (i.e., the snap features 74 are configured to hold the optic 71 in place relative to a circuit board comprising six sides, each side substantially parallel to one other of the sides and substantially perpendicular to four other of the sides, i.e., the snap features 74 are first and second structures configured to hold the optic 71 in place relative to a circuit board by contacting opposite sides of the circuit board). With the circuit board 61 received in the region 73 and with the chips 62 pointed upward (in the orientation depicted in FIG. 8), the chips 62 are directly beneath the optical feature 72. The optic 71 is made of substantially transparent material, and so the optical feature 72 is a substantially transparent region. A first dimension $t_1$ of the optic 71 is not larger than about 10 mm, and a second dimension w of the optic 71 is not larger than about 15 mm.

Figure 9:
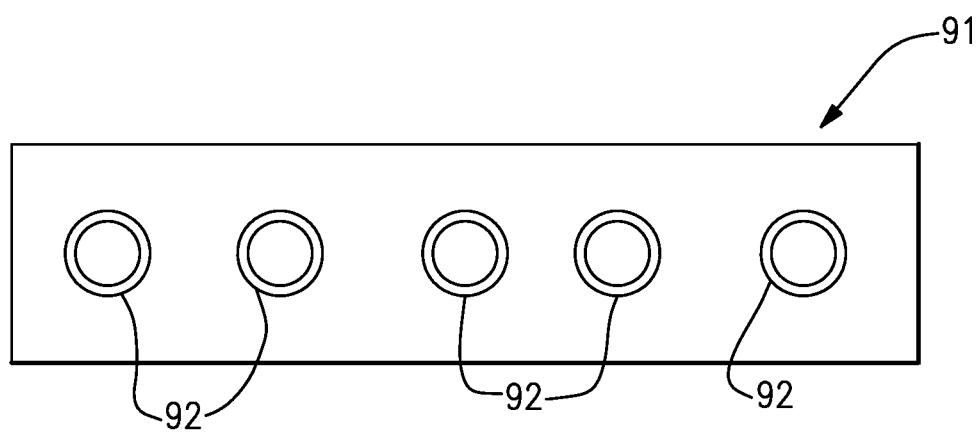
FIG. 9 is a schematic top view of an alternative optic 91 for use with the circuit board 61 depicted in FIG. 6.

FIG. 9 is a schematic top view of an alternative optic 91 for use with the circuit board 61 depicted in FIG. 6. As seen in FIG. 9, the optic 91 comprises five dome regions 92. The circuit board 61 can be positioned relative to the optic 91 such that each of the respective chips 62 is beneath a respective one of the dome regions 92.

In embodiments in which an index-matching element is included, in an arrangement as depicted in FIG. 8, the index-matching element can fill in the space between the circuit board 61 and the optic 71 (i.e., other than the space occupied by the chips 62) and is in the form of a continuous bead, whereas in an arrangement as depicted in FIG. 9, the index-matching element can fill in each of the spaces between the circuit board 61 and the optic 91 (i.e., other than the space occupied by the chips 62) and is in the form of a series of globs.

Figure 10:
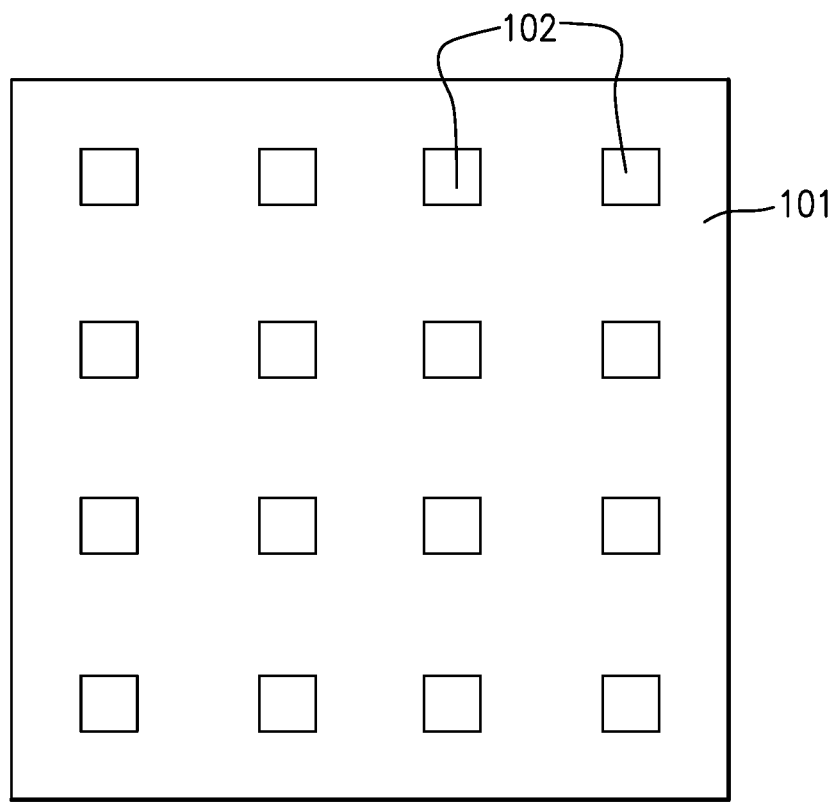
FIG. 10 is a schematic top view of an alternative circuit board 101 on which sixteen light emitting diode chips 102 are mounted (chip-on-board).
Figure 11:
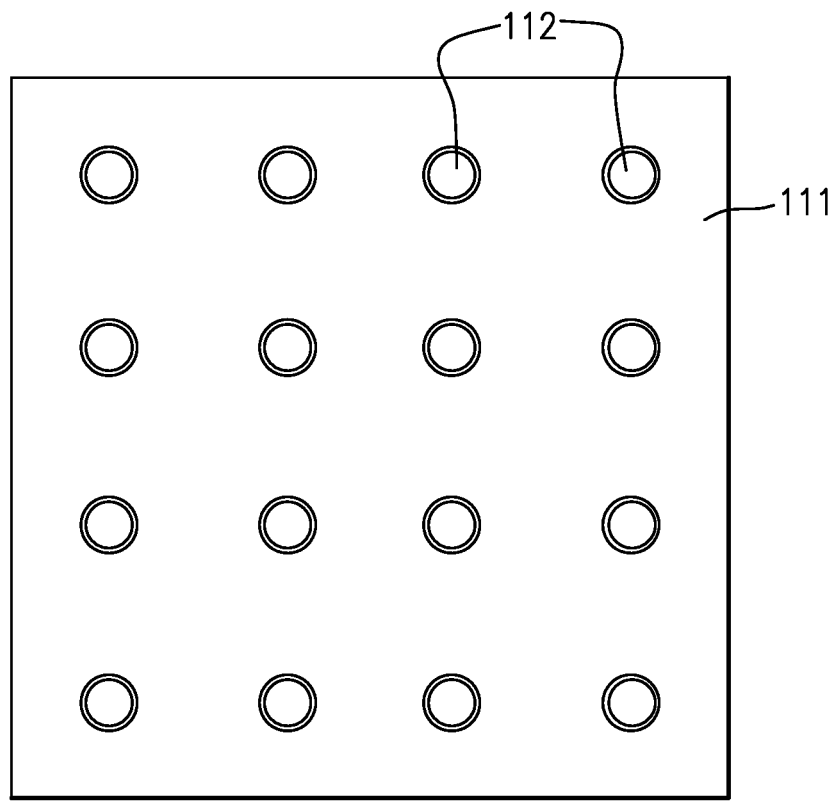
FIG. 11 is a schematic top view of an alternative optic 111 for use with the circuit board 101 depicted in FIG. 10.

FIG. 10 is a schematic top view of an alternative circuit board 101 on which sixteen light emitting diode chips 102 are mounted (chip-on-board), and FIG. 11 is a schematic top view of an alternative optic 111 for use with the circuit board 101 depicted in FIG. 10. The optic 111 comprises sixteen dome regions 112. The circuit board 101 can be positioned relative to the optic 111 such that each of the respective chips 102 is beneath one of the respective dome regions 112.

Figure 12:
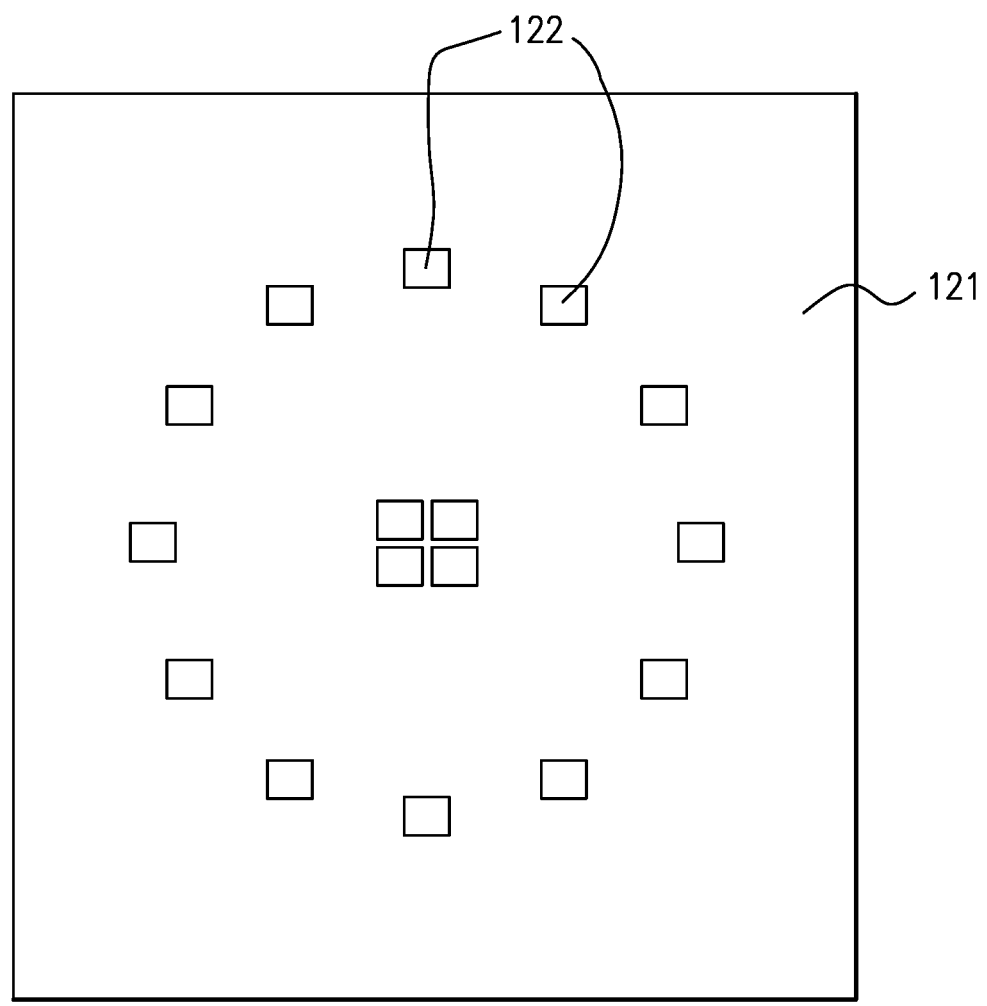
FIG. 12 is a schematic top view of an alternative circuit board 121 on which sixteen light emitting diode chips 122 are mounted (chip-on-board).
Figure 13:
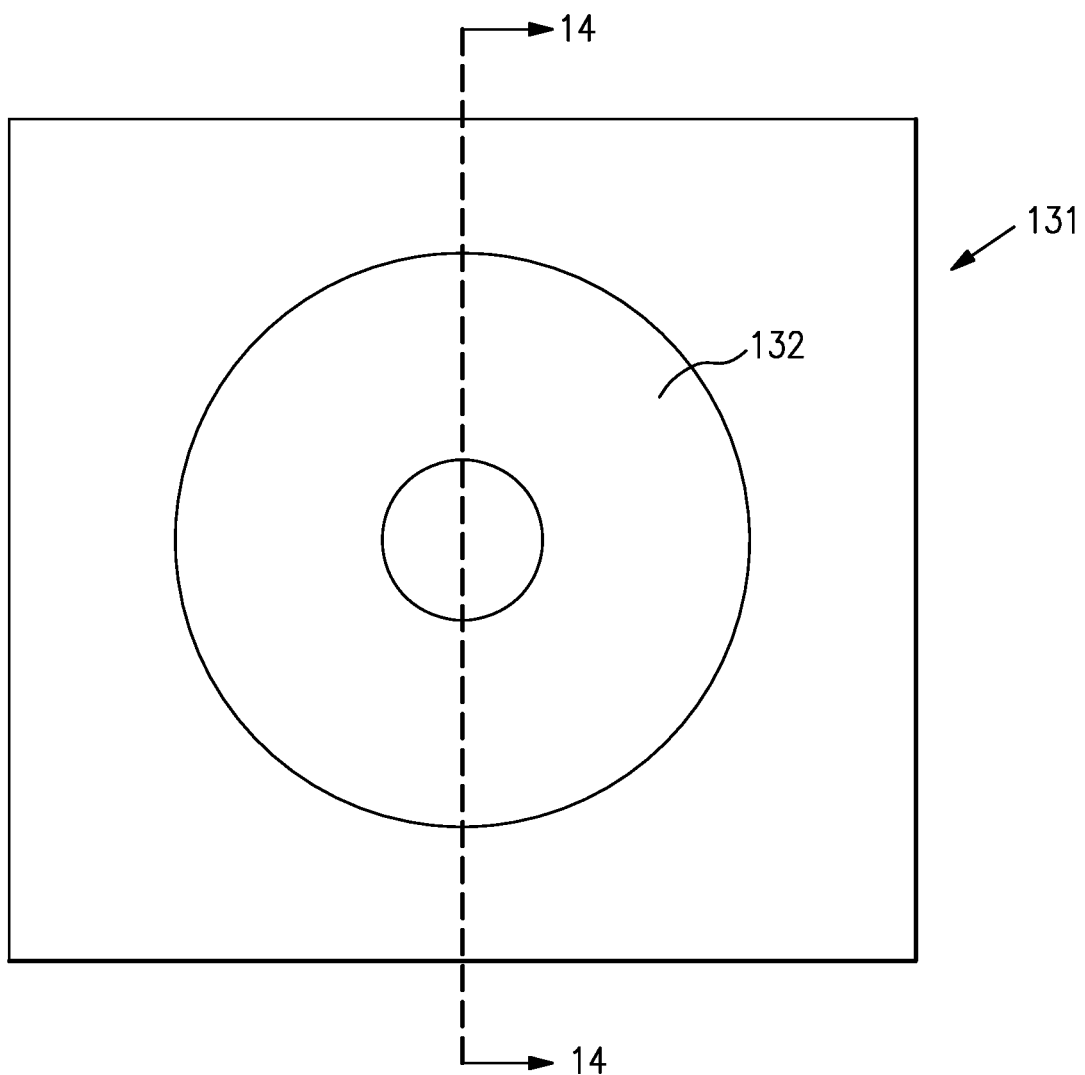
FIG. 13 is a schematic top view of an alternative optic 131 for use with the circuit board 121 depicted in FIG. 12.
Figure 14:
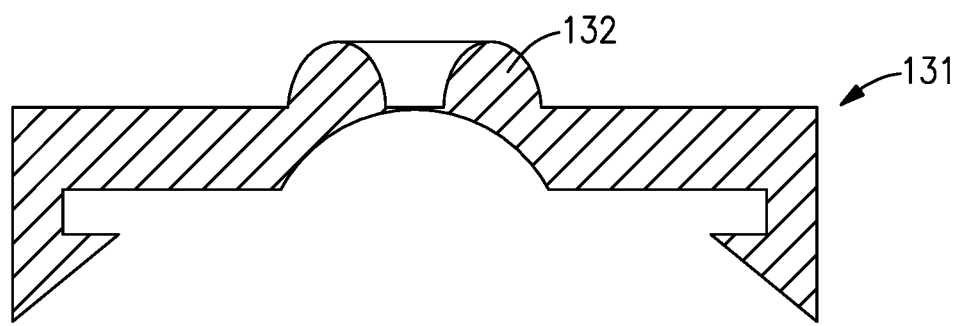
FIG. 14 is a schematic cross-sectional view of the optic 131 along plane 14-14.

FIG. 12 is a schematic top view of an alternative circuit board 121 on which sixteen light emitting diode chips 122 are mounted (chip-on-board), and FIG. 13 is a schematic top view of an alternative optic 131 for use with the circuit board 121 depicted in FIG. 12. The optic 131 comprises a continuous optical feature 132. FIG. 14 is a schematic cross-sectional view of the optic 131 along plane 14-14.

Figure 15:
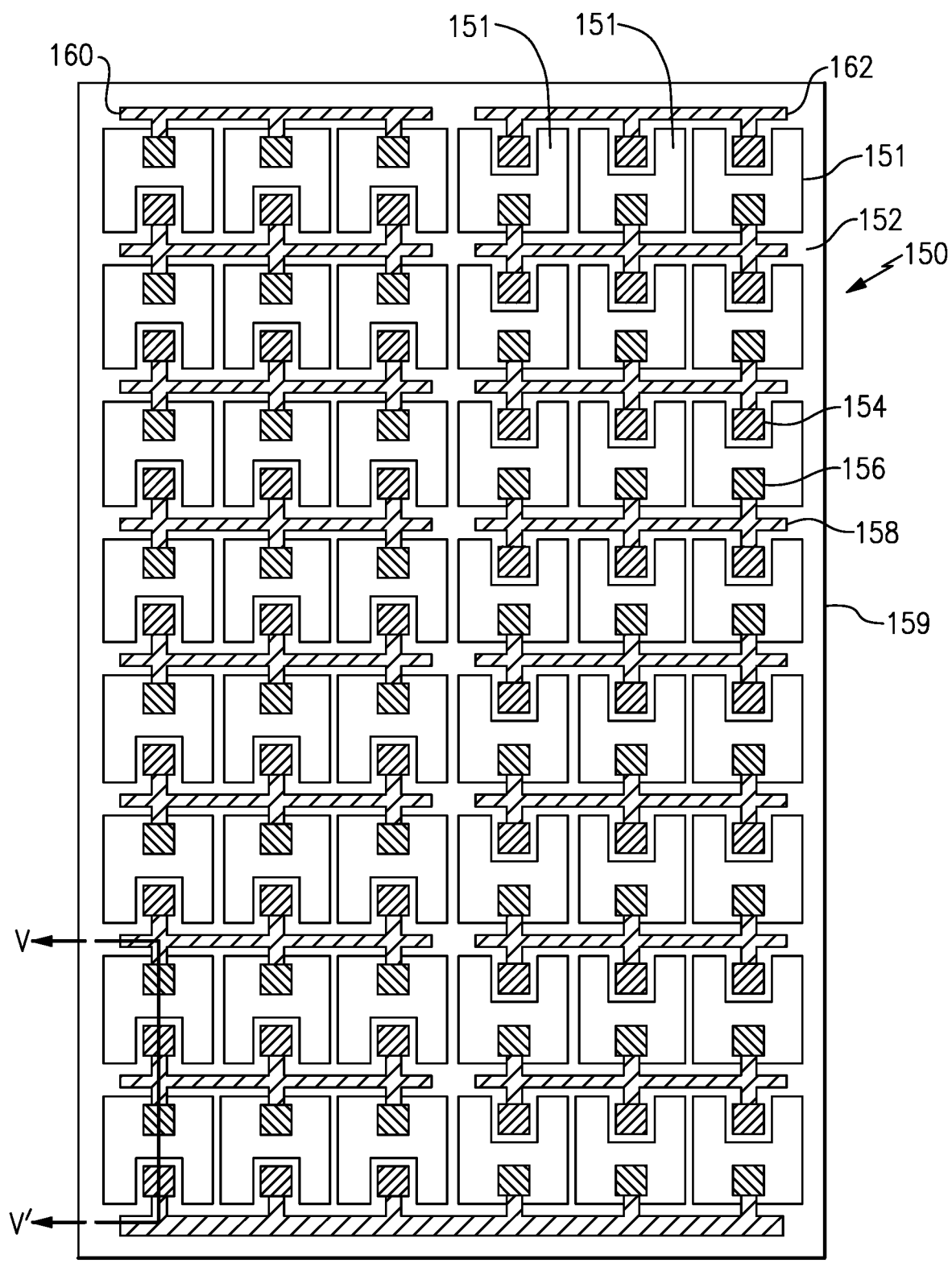
FIG. 15 is a top plan view of a high voltage monolithic light emitter 150 that can be employed in some embodiments in accordance with the present inventive subject matter.

FIG. 15 is a top plan view of a high voltage monolithic light emitter 150 that can be employed (e.g., as the chip in the embodiment depicted in FIG. 3-5, and/or as one of the chips in the embodiments depicted in FIG. 6, 10 or 12) in some embodiments in accordance with the present inventive subject matter. FIG. 15 depicts a solid state light emitter that comprises a plurality of light emitting devices formed by depositing stacked active layers on a wafer and/or substrate, and then isolating respective regions of those stacked layers from each other to provide a plurality of light emitting devices which are mechanically connected to one another. As seen in FIG. 15, the light emitter 150 includes a plurality of light emitting devices 151 on a common substrate 159. The lighting emitting devices 151 are defined by isolation regions 152 that define the peripheries of the individual light emitting devices 151. The individual light emitting devices 151 each have an anode contact 156 and a cathode contact 154.

As seen in FIG. 15, the anode contacts 156 of light emitting devices 151 in subsequent rows are connected to the cathode contacts 154 of devices 151 in previous rows by the interconnection patterns 158. The anodes 156 of devices 151 in a first row of the light emitter 150 are connected together to provide an anode contact 160 for the monolithic light emitter 150. The cathode contacts 154 of the last row of devices 151 in the array are also connected together to provide a cathode contact 162 for the monolithic light emitter 150. Thus, the structure of FIG. 15 provides an array of light emitting devices 151.

Figure 16:
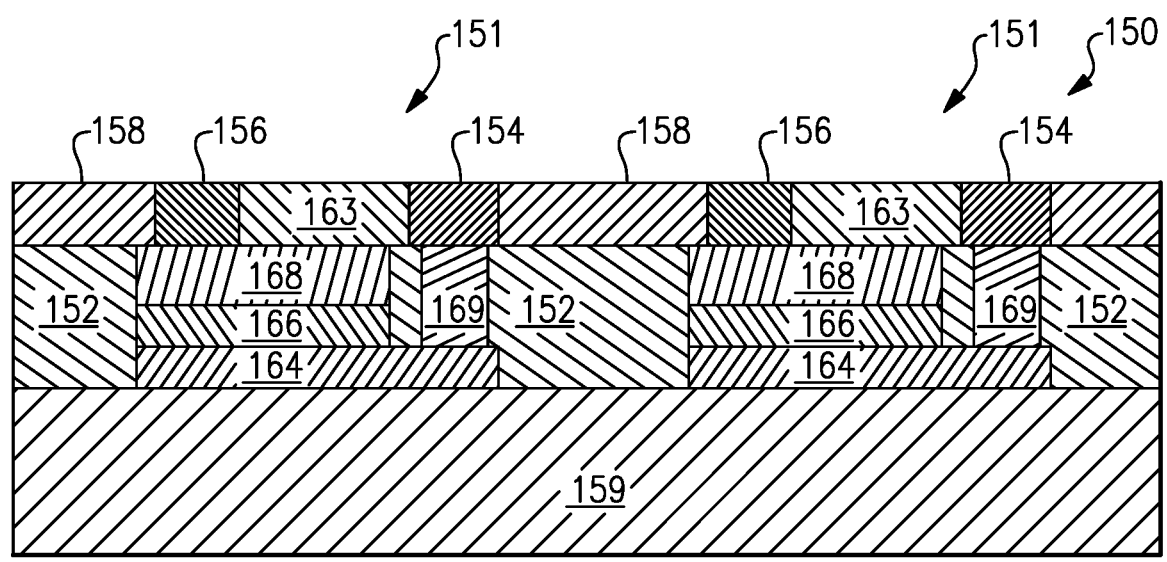
FIG. 16 is an exemplary cross-sectional illustration of the monolithic light emitter 150 taken along plane 15-15.

FIG. 16 is an exemplary cross-sectional illustration of the monolithic light emitter 150 taken along plane 15-15. As seen in FIG. 16, multiple light emitting devices are provided on a common substrate 159. The substrate 159 may comprise any suitable material or combination of materials. For example, the substrate may comprise sapphire, SiC, AN, GaN, ZnO or other suitable semiconductor substrate. The particular material for the substrate 159 may be selected based on the light emitting devices to be formed on the substrate. Substrates and techniques for forming light emitting devices on substrates are known to those of skill in the art.

Furthermore, in some embodiments, the substrate 159 may be removed or thinned after forming the light emitter 150, e.g., after mounting the monolithic light emitter 150 on a circuit board.

Each light emitting device 151 depicted in FIG. 16 also includes an n-type semiconductor layer 164 that may act as a contact layer, one or more quantum well layers 166 and a p-type semiconductor layer 168 that also may act as a contact layer. These layers are collectively referred to as the active layers of the device.

The individual devices 151 of the lighting device 150 are defined by isolation regions 152. The isolation regions 152 may, in some embodiments, be provided by ion implantation to create insulating or semi-insulating regions that extend through the active layers as illustrated in FIG. 16. Alternatively or additionally, trenches could be formed between the devices 151. The trenches could, optionally, be filled with an insulator, such as $SiO_x$ or SiN, to provide a more planar surface on which the electrical interconnect 158 is provided. Combinations of trenches and implantation could also be provided. For example, a trench could be formed and then ions implanted into the sidewalls and/or bottom of the trench to make these regions insulating or semi-insulating.

Also illustrated in FIG. 16 is an $n^+$ contact region 169 that extends from a top surface of the device through the isolating region 152 to the n-type layer 164. The $n^+$ contact region 169 allows for the formation of the cathode contact 154 to provide a more planar device. The $n^+$ contact region 169 may, for example, be provided by ion implantation through the isolation region to the n-type layer 164. An n-type contact 154 provides a cathode contact for each device and a p-type contact 156 provides an anode contact for each device.

FIG. 16 also illustrates an optional insulating layer 163 that may be provided on exposed portions of the devices and/or between devices. The insulating layer 163 may function as a protective and/or passivation layer for the devices.

Figure 17:
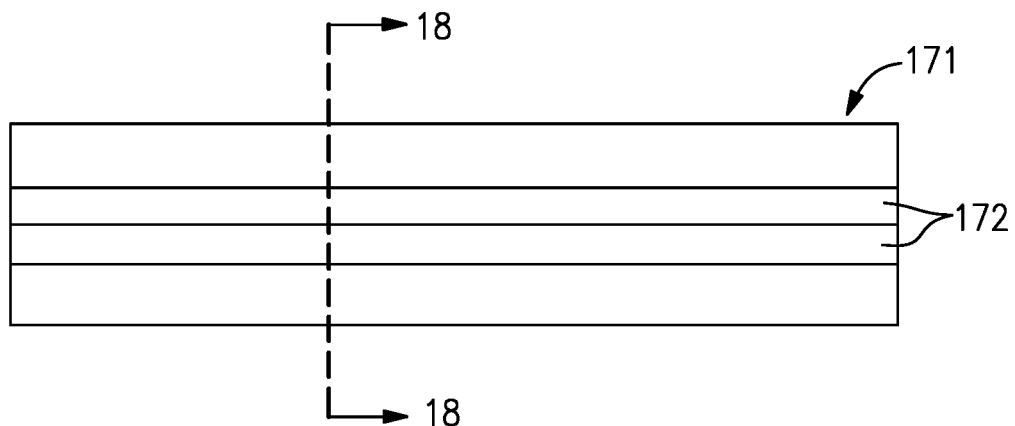
FIG. 17 is a schematic top view of an alternative optic 171 for use with the circuit board 61 depicted in FIG. 6.
Figure 18:
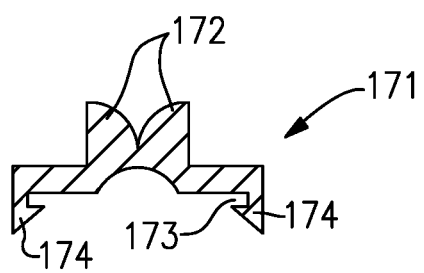
FIG. 18 is a schematic cross-sectional view of the optic 171, taken along the plane 18-18 in FIG. 17.

FIG. 17 is a schematic top view of an alternative optic 171 for use with the circuit board 61 depicted in FIG. 6. FIG. 18 is a schematic cross-sectional view of the optic 171, taken along the plane 18-18 in FIG. 17. As seen in FIGS. 17 and 18, the optic 171 comprises a continuous optical feature 172 extending along the long dimension of the optic 171. The circuit board 61 can be received in the region 173 defined by the optic 171, and can be held in place by snap features 174 which extend along the long dimension of the optic 171. With the circuit board 61 received in the region 173 and with the chips 62 pointed upward (in the orientation depicted in FIG. 18), the chips 62 are directly beneath the optical feature 172. The optical feature 172 can be configured to provide any suitable optical property, e.g., in the embodiment depicted in FIG. 18, the optical feature 172 provides a sidelooker feature for a solid state light emitter on a circuit board positioned within the region 173.

Figure 19:
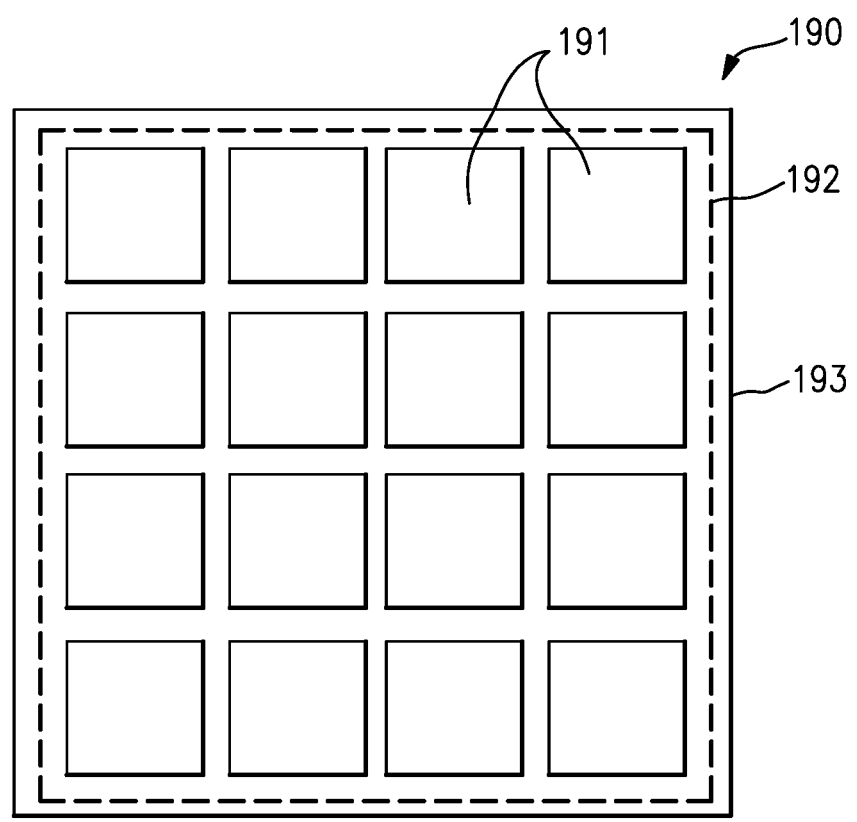
FIG. 19 is a top plan view of a high voltage light emitter 190 that can be employed in some embodiments in accordance with the present inventive subject matter.

FIG. 19 is a top plan view of a high voltage light emitter 190 that can be employed (e.g., as the chip in the embodiment depicted in FIG. 3-5, and/or as one of the chips in the embodiments depicted in FIG. 6, 10 or 12) in some embodiments in accordance with the present inventive subject matter. FIG. 19 depicts a solid state light emitter 190 that comprises a plurality of light emitting diode chips 191 arranged in series on a first region 192 of a circuit board 193. In some embodiments, the first region can have a surface area of not larger than about 2.0 square millimeters.

FIG. 20 is a schematic sectional view of a lamp 200 that comprises a circuit board 201, a solid state light emitter 202 on the circuit board 201, an optic 203, a housing 204 and a diffuser 205. In this embodiment, the housing 204 comprises a plurality of heat dissipation fins 206, and can be formed of any suitable material, e.g., aluminum.

FIG. 21 is a schematic perspective view of a lamp 210 in the form of a linear troffer, comprising a lighting device 211 (which comprises a circuit board with ten light emitting diode chips mounted thereon in a line, and a corresponding optic) and a reflective housing 212.

Furthermore, while certain embodiments of the present inventive subject matter have been illustrated with reference to specific combinations of elements, various other combinations may also be provided without departing from the teachings of the present inventive subject matter. Thus, the present inventive subject matter should not be construed as being limited to the particular exemplary embodiments described herein and illustrated in the Figures, but may also encompass combinations of elements of the various illustrated embodiments.

Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the inventive subject matter.

Any two or more structural parts of the lighting devices described herein can be integrated. Any structural part of the lighting devices described herein can be provided in two or more parts (which may be held together in any known way, e.g., with adhesive, screws, bolts, rivets, staples, etc.).

The invention claimed is:

1. A lighting device, comprising:
at least a first circuit board;
at least first and second solid state light emitters on the first circuit board; and
at least a first optic held in place relative to the first circuit board,
at least part of the first solid state light emitter between a first portion of the first circuit board and a first portion of the first optic,
at least a portion of light emitted from the first solid state light emitter passes through the first optic,
at least part of the second solid state light emitter between a second portion of the first circuit board and a second portion of the first optic,
at least a portion of light emitted from the second solid state light emitter passes through the first optic,
the first optic is on the first and second solid state light emitters, and
the first optic is flame-rated, wherein the lighting device is devoid of any flame-rated optic that is not on any of the at least first and second solid state light emitters.

2. A lighting device as recited in claim 1, wherein the first optic is in direct contact with the first circuit board.

3. A lighting device as recited in claim 1, wherein at least part of the first circuit board is between first and second portions of the first optic.

4. A lighting device as recited in claim 1, wherein:
the first circuit board is between first and second surfaces of the first optic;
the first circuit board is between third and fourth surfaces of the first optic;
the first and second surfaces of the first optic are substantially parallel to each other;
the third and fourth surfaces of the first optic are substantially parallel to each other; and
the first and second surfaces of the first optic are substantially perpendicular to the third and fourth surfaces of the first optic.

5. A lighting device as recited in claim 1, wherein:
the lighting device further comprises a housing and at least one lens and/or at least one diffuser and/or at least one light control element;
the first optic is within a space defined by the housing and the at least one lens, diffuser and/or light control element.

6. A lighting device as recited in claim 1, wherein:
the first circuit board is held in place relative to the first optic by at least one of:
the first circuit board comprising a region that extends into an opening on the first optic;
the first optic comprising a region that extends into an opening on the first circuit board;
the first optic comprises at least one first optic flexible structure that assists in holding the first circuit board in place relative to the first optic with no force being applied to the first optic flexible structure;
the first circuit board comprises at least one first circuit board flexible structure that assists in holding the first optic in place relative to the first circuit board with no force being applied to the first circuit board flexible structure;
the first circuit board comprises first circuit board threads, the first optic comprises first optic threads, and the first optic threads are threaded on the first circuit board threads;
the first optic comprises at least one first optic clip that engages the first circuit board;
the first circuit board comprises at least one first circuit board clip that engages the first optic;
the first circuit board and the first optic are attached to each other by at least one screw, bolt and/or rivet that extends through at least a portion of the first optic and at least a portion of the first circuit board;
the first circuit board and the first optic are attached to each other by at least one adhesive; and
the first circuit board and the first optic comprise respective complementary geometrical surfaces that engage each other to hold the first circuit board in place relative to the first optic.

7. A lighting device as recited in claim 1, wherein at least a first dimension of the lighting device is not larger than about 10 mm.

8. A lighting device as recited in claim 7, wherein at least a second dimension of the lighting device is not larger than about 15 mm.

9. A lighting device as recited in claim 1, wherein:
the first circuit board comprises first and second major surfaces and at least a first edge, the first major surface is substantially parallel to the second major surface,
the first edge extends from the first major surface to the second major surface,
the first optic comprises a first region and a second region, and
the first and second regions of the first optic are to opposite sides of the first and second major surfaces of the first circuit board.

10. A lighting device as recited in claim 9, wherein:
the first optic further comprises at least a third region and a fourth region,
the third and fourth regions of the first optic are to opposite sides of the first edge of the first circuit board.

11. A lighting device as recited in claim 1, wherein:
the lighting device comprises at least ten solid state light emitters arranged substantially along a line,
the lighting device further comprises at least one lens,
the area of the first circuit board is 5% or less of the area of the at least one lens.

12. A lighting device as recited in claim 1, wherein:
the first solid state light emitter is a first light emitting diode chip, and
the second solid state light emitter is a second light emitting diode chip.

13. A lighting device as recited in claim 1, wherein:
the first solid state light emitter is a first LED, and
the second solid state light emitter is a second LED.

14. A lighting device as recited in claim 1, wherein:
the first solid state light emitter is a first light emitting diode chip, and
the second solid state light emitter is a first LED.

15. A lighting device, comprising:
at least a first circuit board;
at least first and second solid state light emitters; and
at least a first optic,
at least a portion of light emitted from the first solid state light emitter passes through the first optic,
at least a portion of light emitted from the second solid state light emitter passes through the first optic,
the first optic is on the first and second solid state light emitters,
the first optic is flame-rated,
the first circuit board held in place relative to the first optic by at least one of:
  the first circuit board comprising a region that extends into an opening on the first optic;
  the first optic comprising a region that extends into an opening on the first circuit board;
  the first optic comprises at least one first optic flexible structure that assists in holding the first circuit board in place relative to the first optic with no force being applied to the first optic flexible structure;
  the first circuit board comprises at least one first circuit board flexible structure that assists in holding the first optic in place relative to the first circuit board with no force being applied to the first circuit board flexible structure;
  the first circuit board comprises first circuit board threads, the first optic comprises first optic threads, and the first optic threads are threaded on the first circuit board threads;
  the first optic comprises at least one first optic clip that engages the first circuit board;
  the first circuit board comprises at least one first circuit board clip that engages the first optic;
  the first circuit board and the first optic are attached to each other by at least one screw, bolt and/or rivet that extends through at least a portion of the first optic and at least a portion of the first circuit board;
  the first circuit board and the first optic are attached to each other by at least one adhesive; and
  the first circuit board and the first optic comprise respective complementary geometrical surfaces that engage each other to hold the first circuit board in place relative to the first optic,
wherein the lighting device is devoid of any flame-rated optic that is not on any of the at least first and second solid state light emitters.

16. A lighting device as recited in claim 15, wherein:
the lighting device further comprises a housing and at least one lens and/or at least one diffuser and/or at least one light control element;
the first optic is within a space defined by the housing and the at least one lens, diffuser and/or light control element.

17. A lighting device as recited in claim 15, wherein the first and second solid state light emitters are on the first circuit board.

18. A lighting device as recited in claim 15, wherein:
at least part of the first solid state light emitter is between a first portion of the first circuit board and a first portion of the first optic, and
at least part of the second solid state light emitter is between a second portion of the first circuit board and a second portion of the first optic.

19. A lighting device as recited in claim 15, wherein:
the first solid state light emitter is a first light emitting diode chip, and
the second solid state light emitter is a second light emitting diode chip.

20. A lighting device as recited in claim 15, wherein:
the first solid state light emitter is a first LED, and
the second solid state light emitter is a second LED.

21. A lighting device as recited in claim 15, wherein:
the first solid state light emitter is a first light emitting diode chip, and
the second solid state light emitter is a first LED.

22. A lighting device, comprising:
at least a first circuit board;
at least first and second solid state light emitters; and
at least a first optic held in place relative to the first circuit board,
at least a portion of light emitted from the first solid state light emitter passes through the first optic,
at least a portion of light emitted from the second solid state light emitter passes through the first optic,
the first optic is on the first and second solid state light emitters,
the first optic is flame-rated, and
at least a first dimension of the lighting device is not larger than about 10 mm,
wherein the lighting device is devoid of any flame-rated optic that is not on any of the at least first and second solid state light emitters.

23. A lighting device as recited in claim 22, wherein at least a second dimension of the lighting device is not larger than about 15 mm.

24. A lighting device as recited in claim 22, wherein:
the lighting device further comprises a housing and at least one lens and/or at least one diffuser and/or at least one light control element;

the first optic is within a space defined by the housing and the at least one lens, diffuser and/or light control element.

25. A lighting device as recited in claim 22, wherein the first and second solid state light emitters are on the first circuit board.

26. A lighting device as recited in claim 22, wherein:
at least part of the first solid state light emitter is between a first portion of the first circuit board and a first portion of the first optic, and
at least part of the second solid state light emitter is between a second portion of the first circuit board and a second portion of the first optic.

27. A lighting device as recited in claim 22, wherein:
the first solid state light emitter is a first light emitting diode chip, and
the second solid state light emitter is a second light emitting diode chip.

28. A lighting device as recited in claim 22, wherein:
the first solid state light emitter is a first LED, and
the second solid state light emitter is a second LED.

29. A lighting device as recited in claim 22, wherein:
the first solid state light emitter is a first light emitting diode chip, and
the second solid state light emitter is a first LED.

* * * * *